(12) United States Patent
Selinger et al.

(10) Patent No.: US 8,924,265 B2
(45) Date of Patent: Dec. 30, 2014

(54) SYSTEM AND PROCESS FOR IMPROVING PRODUCT RECOMMENDATIONS FOR USE IN PROVIDING PERSONALIZED ADVERTISEMENTS TO RETAIL CUSTOMERS

(71) Applicant: RichRelevance, Inc., San Francisco, CA (US)

(72) Inventors: David Lee Selinger, Castro Valley, CA (US); Tyler David Kohn, San Francisco, CA (US); Michael DeCourcey, Belmont, CA (US); Sundeep Ahuja, Gold River, CA (US); James Osial, San Francisco, CA (US); Albert Sunwoo, San Francisco, CA (US)

(73) Assignee: RichRelevance, Inc., San Francisco, CA (US)

( * ) Notice: Subject to any disclaimer, the term of this patent is extended or adjusted under 35 U.S.C. 154(b) by 11 days.

(21) Appl. No.: 13/741,251

(22) Filed: Jan. 14, 2013

(65) Prior Publication Data

US 2013/0198007 A1    Aug. 1, 2013

Related U.S. Application Data

(63) Continuation of application No. 12/151,376, filed on May 6, 2008, now Pat. No. 8,364,528.

(51) Int. Cl.
*G06Q 30/00* (2012.01)
*G06Q 30/02* (2012.01)
*G06Q 30/06* (2012.01)

(52) U.S. Cl.
CPC ............ *G06Q 30/0269* (2013.01); *G06Q 30/00* (2013.01); *G06Q 30/02* (2013.01); *G06Q 30/0601* (2013.01)

USPC ................... 705/26.7; 705/14.25; 705/14.43; 705/14.49; 705/14.52; 705/14.53; 705/14.66

(58) Field of Classification Search
None
See application file for complete search history.

(56) References Cited

U.S. PATENT DOCUMENTS

| | | | |
|---|---|---|---|
| 5,855,006 A | | 12/1998 | Huemoeller et al. |
| 5,983,335 A | * | 11/1999 | Dwyer, III ...................... 712/23 |
| 6,005,597 A | | 12/1999 | Barrett et al. |
| 6,049,777 A | * | 4/2000 | Sheena et al. ................ 705/7.32 |

(Continued)

FOREIGN PATENT DOCUMENTS

| | | |
|---|---|---|
| WO | WO 00/02389 | 1/2000 |
| WO | WO 00/08573 | 2/2000 |

OTHER PUBLICATIONS

Kazienko et al., "AdROSA—Adaptive personalization of web advertising," Information Sciences, 117(11), Jun. 1, 2007, pp. 2269-2295, Available online Jan. 15, 2007. (http://www.Sciencedirect.com/science/article/pii/S0020025507000229).

*Primary Examiner* — Gregory Johnson
(74) *Attorney, Agent, or Firm* — Seed IP Law Group PLLC

(57) ABSTRACT

A system and process for improving product recommendations for a first user includes receiving a request for one or more product recommendations for a first user, each product recommendation being associated with any one of a plurality of retailers, receiving a plurality of recommendation sets from one or more automated product recommendation systems, wherein the plurality of recommendation sets are generated using different selection models and using ensemble learning to select one or more most relevant product recommendation sets from the plurality of product recommendation sets.

30 Claims, 17 Drawing Sheets

(56) References Cited

U.S. PATENT DOCUMENTS

| | | | |
|---|---|---|---|
| 6,064,980 A | 5/2000 | Jacobi et al. | |
| 6,112,186 A * | 8/2000 | Bergh et al. | 705/7.32 |
| 6,154,732 A * | 11/2000 | Tarbox | 705/36 R |
| 6,285,991 B1 | 9/2001 | Powar | |
| 6,321,221 B1 * | 11/2001 | Bieganski | 705/26.7 |
| 6,334,127 B1 * | 12/2001 | Bieganski et al. | 1/1 |
| 6,412,012 B1 * | 6/2002 | Bieganski et al. | 709/232 |
| 6,438,579 B1 * | 8/2002 | Hosken | 709/203 |
| 6,487,539 B1 * | 11/2002 | Aggarwal et al. | 705/14.23 |
| 6,722,573 B2 * | 4/2004 | Haddad et al. | 235/492 |
| 7,013,238 B1 * | 3/2006 | Weare | 702/182 |
| 7,050,986 B1 | 5/2006 | Vance et al. | |
| 7,113,917 B2 * | 9/2006 | Jacobi et al. | 705/14.53 |
| 7,158,959 B1 | 1/2007 | Chickering et al. | |
| 7,181,768 B1 * | 2/2007 | Ghosh et al. | 726/23 |
| 7,280,987 B2 * | 10/2007 | Chen et al. | 706/15 |
| 7,542,951 B1 * | 6/2009 | Chakrabarti et al. | 706/45 |
| 7,584,159 B1 * | 9/2009 | Chakrabarti et al. | 706/45 |
| 7,676,400 B1 | 3/2010 | Dillon | |
| 7,689,457 B2 * | 3/2010 | Chan et al. | 705/26.7 |
| 7,693,652 B2 | 4/2010 | Cheung | |
| 7,809,601 B2 * | 10/2010 | Shaya et al. | 705/7.31 |
| 7,809,663 B1 * | 10/2010 | Birch et al. | 706/45 |
| 7,860,925 B1 * | 12/2010 | Gheorghe et al. | 709/203 |
| 7,949,659 B2 * | 5/2011 | Chakrabarti et al. | 707/732 |
| 7,966,334 B1 * | 6/2011 | Bezos et al. | 707/748 |
| 8,065,244 B2 * | 11/2011 | Chen et al. | 706/15 |
| 8,095,521 B2 * | 1/2012 | Chan et al. | 707/705 |
| 8,175,989 B1 * | 5/2012 | Gopinath et al. | 706/45 |
| 8,250,408 B1 * | 8/2012 | Cohen et al. | 714/33 |
| 8,364,528 B2 * | 1/2013 | Selinger et al. | 705/14.4 |
| 2002/0052873 A1 | 5/2002 | Delgado et al. | |
| 2002/0161664 A1 * | 10/2002 | Shaya et al. | 705/26 |
| 2003/0004652 A1 * | 1/2003 | Brunner et al. | 702/19 |
| 2003/0047599 A1 * | 3/2003 | Haddad et al. | 235/380 |
| 2003/0050916 A1 * | 3/2003 | Ortega et al. | 707/1 |
| 2003/0078985 A1 * | 4/2003 | Holbrook et al. | 709/213 |
| 2003/0101451 A1 | 5/2003 | Bentolila et al. | |
| 2003/0105682 A1 * | 6/2003 | Dicker et al. | 705/27 |
| 2003/0182249 A1 * | 9/2003 | Buczak | 706/15 |
| 2003/0191709 A1 * | 10/2003 | Elston et al. | 705/40 |
| 2003/0191753 A1 * | 10/2003 | Hoch | 707/3 |
| 2003/0208399 A1 * | 11/2003 | Basak et al. | 705/14 |
| 2003/0229531 A1 | 12/2003 | Heckerman et al. | |
| 2003/0229537 A1 | 12/2003 | Dunning et al. | |
| 2004/0039657 A1 * | 2/2004 | Behrens et al. | 705/26 |
| 2004/0054572 A1 * | 3/2004 | Oldale et al. | 705/10 |
| 2004/0059626 A1 | 3/2004 | Smallwood | |
| 2004/0064577 A1 * | 4/2004 | Dahlin et al. | 709/235 |
| 2004/0143453 A1 * | 7/2004 | Weaver | 705/2 |
| 2004/0193582 A1 * | 9/2004 | Smyth | 707/3 |
| 2004/0215746 A1 * | 10/2004 | McCanne et al. | 709/219 |
| 2005/0004880 A1 | 1/2005 | Musgrove et al. | |
| 2005/0048972 A1 * | 3/2005 | Dorenbosch et al. | 455/436 |
| 2005/0071301 A1 * | 3/2005 | Kuroiwa | 706/12 |
| 2005/0085973 A1 * | 4/2005 | Furem et al. | 701/50 |
| 2005/0097517 A1 * | 5/2005 | Goin et al. | 717/124 |
| 2005/0102246 A1 * | 5/2005 | Movellan et al. | 706/12 |
| 2005/0102292 A1 | 5/2005 | Tamayo et al. | |
| 2005/0193002 A1 * | 9/2005 | Souders et al. | 707/103 X |
| 2005/0220336 A1 * | 10/2005 | Sabe et al. | 382/159 |
| 2006/0015508 A1 | 1/2006 | Kondo et al. | |
| 2006/0047590 A1 * | 3/2006 | Anderson et al. | 705/35 |
| 2006/0069576 A1 * | 3/2006 | Waldorf et al. | 705/1 |
| 2006/0161481 A1 * | 7/2006 | Krulik | 705/26 |
| 2006/0229932 A1 * | 10/2006 | Zollo et al. | 705/10 |
| 2006/0247848 A1 * | 11/2006 | Cheng | 701/200 |
| 2006/0282328 A1 | 12/2006 | Gerace et al. | |
| 2006/0294084 A1 | 12/2006 | Patel et al. | |
| 2007/0005437 A1 | 1/2007 | Stoppelman | |
| 2007/0061333 A1 * | 3/2007 | Ramer et al. | 707/10 |
| 2007/0073717 A1 * | 3/2007 | Ramer et al. | 707/10 |
| 2007/0118346 A1 * | 5/2007 | Wen et al. | 703/10 |
| 2007/0118498 A1 | 5/2007 | Song et al. | |
| 2007/0156589 A1 * | 7/2007 | Zimler et al. | 705/51 |
| 2007/0203790 A1 * | 8/2007 | Torrens et al. | 705/14 |
| 2008/0010258 A1 * | 1/2008 | Sureka | 707/3 |
| 2008/0103886 A1 | 5/2008 | Li et al. | |
| 2008/0104111 A1 * | 5/2008 | Slaney et al. | 707/104.1 |
| 2008/0154737 A1 * | 6/2008 | Linkswiler | 705/26 |
| 2008/0208072 A1 * | 8/2008 | Fadem et al. | 600/544 |
| 2008/0208786 A1 * | 8/2008 | Serrano-Morales et al. | 706/47 |
| 2008/0215428 A1 * | 9/2008 | Ramer et al. | 705/14 |
| 2008/0228680 A1 * | 9/2008 | Chen et al. | 706/21 |
| 2008/0243637 A1 * | 10/2008 | Chan et al. | 705/27 |
| 2008/0243817 A1 * | 10/2008 | Chan et al. | 707/5 |
| 2008/0243997 A1 * | 10/2008 | Bouzid et al. | 709/203 |
| 2008/0294617 A1 * | 11/2008 | Chakrabarti et al. | 707/5 |
| 2008/0294624 A1 | 11/2008 | Kanigsberg et al. | |
| 2009/0006373 A1 * | 1/2009 | Chakrabarti et al. | 707/5 |
| 2009/0037355 A1 * | 2/2009 | Brave et al. | 706/45 |
| 2009/0055385 A1 * | 2/2009 | Jeon et al. | 707/5 |
| 2009/0112837 A1 * | 4/2009 | Modani et al. | 707/5 |
| 2009/0132459 A1 * | 5/2009 | Hicks | 706/52 |
| 2009/0210475 A1 * | 8/2009 | Gadanho et al. | 709/201 |
| 2009/0248494 A1 * | 10/2009 | Hueter et al. | 705/10 |
| 2009/0281923 A1 * | 11/2009 | Selinger et al. | 705/27 |
| 2010/0042608 A1 * | 2/2010 | Kane, Jr. | 707/5 |
| 2010/0138278 A1 | 6/2010 | Aghasaryan et al. | |
| 2011/0167386 A1 * | 7/2011 | De Wit | 715/825 |
| 2012/0078747 A1 * | 3/2012 | Chakrabarti et al. | 705/26.7 |
| 2013/0198007 A1 * | 8/2013 | Selinger et al. | 705/14.66 |

* cited by examiner

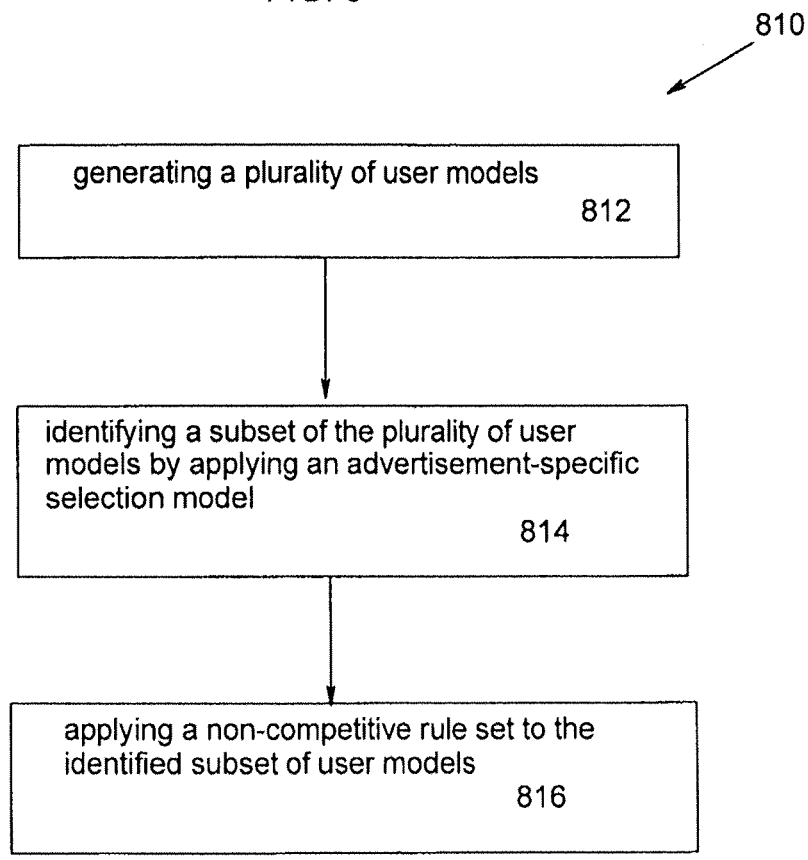

FIG. 9

910 generating a plurality of user models, each associated with an originating retailer
920 optionally generating a plurality of selection models (similarities, etc.)
930 receiving a request to advertise one or more products or services
940 identifying a subset of relevant user models by applying an advertisement targeting model
950 communicating the electronic advertising to the users such that each advertisement appears to have been sent by the respective originating retailer
960

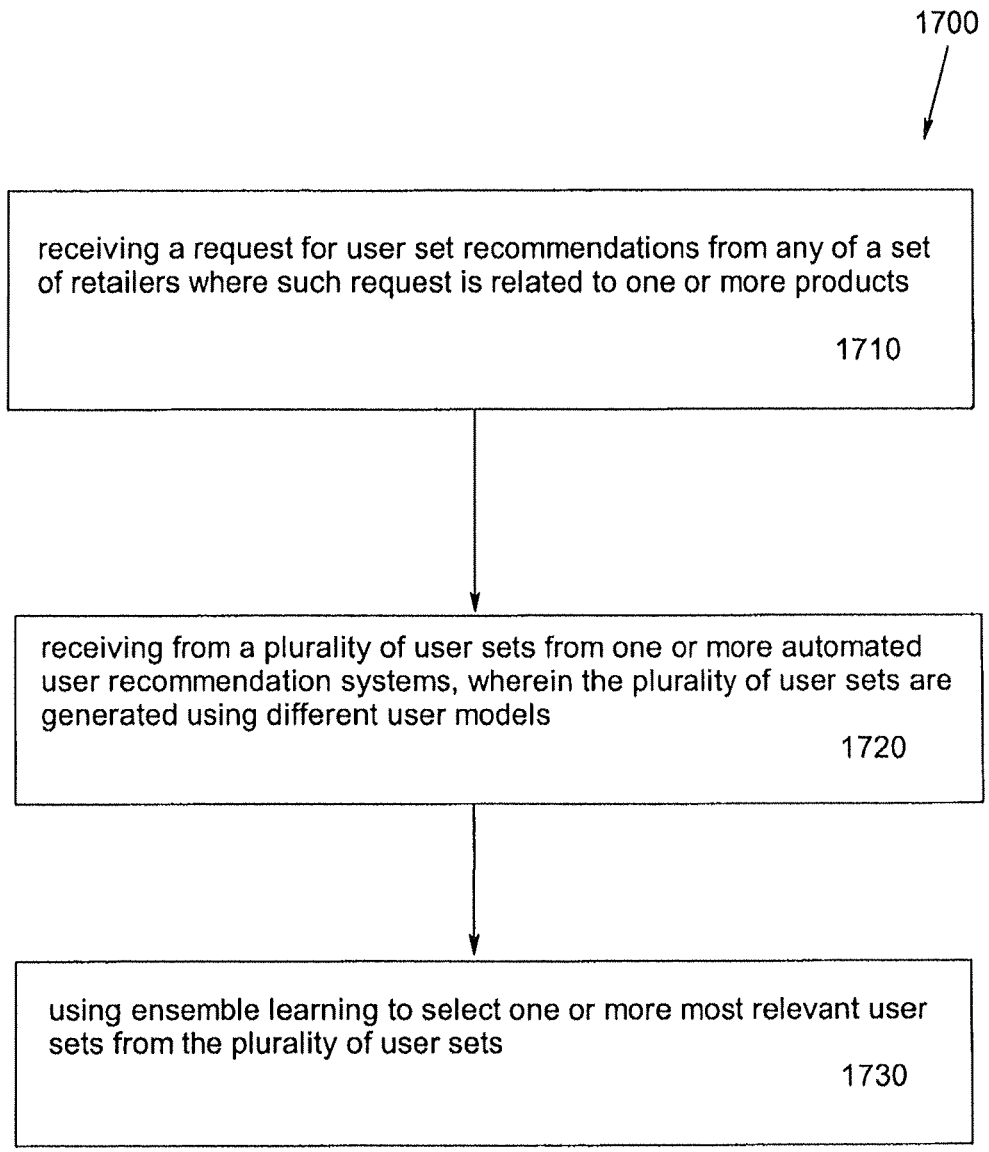

SYSTEM AND PROCESS FOR IMPROVING PRODUCT RECOMMENDATIONS FOR USE IN PROVIDING PERSONALIZED ADVERTISEMENTS TO RETAIL CUSTOMERS

TECHNICAL FIELD

The disclosed embodiments relate generally to a system and method for providing targeted content. More specifically, the present subject matter relates to a system and method for providing targeted content, such as advertising, by analyzing the context in which the content is to be provided in light of known attributes of the content available to be provided and the one or more recipients of the content and using ensemble learning to select the most appropriate content.

BACKGROUND

Providing targeted content can be beneficial to both the provider and the recipient. For example, in an advertising context, both the advertiser and the consumer benefit from targeted advertisements. In this example, the targeted content is the advertisement itself. In this example, the consumer receives ads that are relevant to his or her interests and the advertiser gets improved response to those targeted ads. In order to provide targeted content, the provider must both possess and effectively utilize information about the recipient and further the provider must also posses and effectively utilize information about the content from which the selected content will be selected or generated.

Accordingly, it may be beneficial to provide targeted content, such as, for example, targeted advertisements on a web page, in an e-mail or other electronic or non-electronic formats. However, there are known problems in scenarios such as these in both acquiring information about the recipient of the advertisements and effectively utilizing that information to provide relevant targeted advertisements.

The problem of acquiring information about a recipient, and specifically a recipient of advertisements, is known as a classification problem. A significant portion of this classification problem is in classifying the current context of the recipient. There are two common approaches to the context classification problem typically associated with providing targeted content, particularly in providing targeted advertising: the bucket of words approach and natural language processing.

The bucket of words approach utilizes a context independent analysis of text to determine which words are being used more often than statistically expected in order to determine the subject matter of the text. This approach can be applied to both the web page content and the advertisement content. For example, through analysis of a web page it may be determined that the words "allergy" and "pollen" appear more often than statistically expected. The bucket of words approach interprets the occurrence of these words as demonstrating that the web page content is related to seasonal allergies. The content provider may then use the results of that analysis to determine that visitors to this web page are more likely than the general population to be interested in advertisements regarding seasonal allergy medication and provide an appropriately targeted advertisement. Unfortunately, the bucket of words solution is a fairly inaccurate solution in that the words are analyzed without regard to context and relationship to other words on the web page. This solution often does not provide strong contextual relationships and the results can be skewed heavily by inadequate and/or false information and, therefore, is not optimally targeted.

The natural language processing approach utilizes the basic concepts of the bucket of words approach, but uses contextual extraction (e.g., noun, verb, etc.) to improve the accuracy of the results. Although this approach improves the accuracy of the results, it is also a much slower process, particularly because the content of the web page must be prefiltered in order for the analysis to be effective. Because certain contextual clues are dependent on the vertical market addressed by the web page (the subject matter, i.e., trade based content, or content based on specialized needs, for example, medical, mechanical engineering, etc.) different filters must be used for each vertical market. Prefiltering often involves human involvement in the process which further decreases the efficiency of the process by requiring important steps to be performed offline. As a result, natural language processing cannot be used to run an online real-time analysis of web pages to provide targeted content.

While it is possible to apply the bucket of words approach and the natural language processing approach to classify the targeted content, in many cases related web pages and advertisements are difficult to match together because the classification trees for each are not congruous, even though the subject matter may be. These problems can be dealt with by adding another layer of human involvement in the process, further decreasing efficiency, or by accepting further limitations on optimizing the targeting of the content.

The bucket of words approach and the natural language processing approach are therefore not complete solutions to the problems associated with providing targeted content. The results provided by these approaches are simply groups of words, such as grammar graphs, that may be used to identify the context of the group of words analyzed. However, these sets of words do not provide any map or instructions to link the words/context to targeted content. Moreover, neither solution is capable of analyzing large numbers of words with respect to each of the other words in the set. For example, a naïve Bayes classifier, or similar independent feature model, is only capable of computing pairs or tuples at best, before the model becomes too complex and computationally intractable.

A typical solution for online processing problems is to add more processing power. However, the challenges presented by the classification problem cannot be simply addressed by increasing the processing power of the system. Accordingly, an entirely new approach must be developed in order to provide an improved solution to the classification problem for providing targeted content.

It is also generally beneficial to provide targeted advertisements for display by a retailer with an internet presence, provided that these advertisements are not for competitive products. It should also be understood that the term products refers to both products and/or services. The said retailer with said internet presence may be referred to as the "originating retailer", while the target of the advertisement, if a retailer, may be referred to as the "advertising retailer." Further, non-competitive should be understood to mean generally accepted to not be competitive as understood by the originating retailer. The advertiser, the consumer and the originating retailer benefit from targeted non-competitive ads: the consumer receives ads that are related to his or her interests and/or shopping behavior, the originating retailer gets revenue from displaying the advertising, and the advertiser gets improved response by targeting ads at customers of the originating retailer. In order to provide such targeted advertisements, the provider must possess and effectively utilize information about the recipient, their interests and their current behavior, and further the provider must also posses and effectively utilize information about the advertisements from which the targeted advertisement(s) will be selected. Again, in this example, the targeted content is in the form of an advertisement.

In some cases, the advertiser is also an internet retailer providing goods and services. Further, in some of these cases, the advertisements may be generated from a catalog of products and services. For example, it may be beneficial for a retailer of cell phone ring tones and a retailer of music cds to cross market their non-competitive, perhaps complimentary products. Accordingly, it may be beneficial to provide an advertisement for a ring tone of a song from a particular artist that can be purchased at a first retailer to the purchaser of a compact disc of that particular artist from a second retailer. For example, when a customer buys a Dave Mathews Band CD from FYE.com, it may be beneficial to provide the customer an advertisement for Dave Mathews Band ringtones from a non-competitive retailer.

However, additional problems arise when attempting to effectively utilize targeting information to provide relevant non-competitive advertisements across retailers. The problem of providing such targeted, non-competitive advertisements is a type of prediction problem. A significant portion of this prediction problem is in classifying the context and interests of the recipient. The current solutions to this problem utilize keywords which come directly from a user's immediate search keywords, or from the name or description of a product currently being viewed. These approaches are inaccurate in that the words are analyzed without regard to the user's retail-specific behavior.

A second significant portion of this prediction problem is in classifying the advertisements, in order to accurately predict which of the products or services are relevant to the user. The current solutions to this problem require a user or system to provide keywords which relate to the products or services. This approach is inaccurate in that the words are analyzed without regard to their context or to the behavior of users who are exposed to these products or services.

Another third significant portion of this prediction problem is in identifying advertisements which are non-competitive. For retailers, the current solution is to manually identify and evaluate potential advertisers and advertisements. This approach is cumbersome and leads to a significant restriction of the scale of any potential solution.

Therefore, a need exists for a solution which takes into account at least the behavior of users on the originating retailer site, and at least the behavior of users who are exposed to these products or services, and further to do so while evaluating whether a potential advertiser is competitive to the originating retailer utilizing a more scalable approach, for example a rule-set.

Further problems arise when retailers join together to provide cooperative advertising. Cooperative advertising should be understood to be a form of advertising presented by a retailer which promotes a product or service to a consumer, where such product or service is sold by or related to said retailer, and such advertisement is presented at the request of a third party, most likely the brand or manufacturer of said product or service. It may be beneficial for a group of retailers to use economies of scale to send targeted cooperative advertisements to selected consumers, such that each consumer receives an advertisement provided by a retailer through which the consumer has a preexisting relationship. For example, to secure a relationship with a large brand, Nike, for example, each individual retailer may not have a sufficiently large customer base, but a collection of retailers acting together might be sufficiently large to be of interest to Nike. To this end, it is beneficial to identify a set of users from an original set of users originating from one or more retailers, to whom cooperative electronic advertising may be targeted. The originator of such an advertisement benefits by marketing specific products or services to the customer base of the one or more retailers, thereby increasing the exposure and potential sales of such products and services. The one or more retailers benefit from the revenue generated from the advertising. Further, the consumer benefits by being presented with relevant products or services.

A significant challenge with such a solution when retailers join together to provide cooperative advertising is the creation and utilization of selection models which would enable an advertiser to target the users of one or more retailers. Many advertisers will not purchase cooperative advertising from many single retailers because there is no solution which enables the application of a selection model to more than one retailer at a time. For each product or service an advertiser would like to advertise, an advertiser would currently have to apply a selection model to each potential retailer and interact with numerous systems, each different for each of the different retailers. This is a cumbersome approach which limits the financial viability of such advertisements to only the largest retailers and to only the most important products and services.

Therefore, a need exists for a solution which provides cooperative electronic advertising that leverages the economy of scale of aggregating numerous retailers, creating a single selection model across the one or more merchants.

Recommendation systems are complex to change, but business goals change frequently. Additionally, as different businesses have different needs, it is impossible, or at least incredibly complex, to systematize all of these different needs in a single automated product recommendation system. Further, a user friendly interface would be useful in allowing users to adapt a system to their needs.

Accordingly, a need exists for a system and method enabling a user to quickly and efficiently adapt an automated product recommendation system to meet current business objectives.

Recommendation systems analyze different data about customers and products to determine the best products to recommend to a user. The current state of the art combines many different variables into a single equation for determining products to recommend, or conversely for selecting users for which products are relevant. The approach of using a single equation to determine product recommendations is frequently referred to as a linear combination. These systems inherently have limitations in flexibility. Adding new data requires modifying the system to accommodate the data and then re-calibrating this single equation to use the data. This is cumbersome and requires changing a significant portion of the code. Further, a single equation can not respond quickly to recent trends. A recommendation system may further be designed to choose between competing sets of recommendations. The competing recommendation sets may be provided, for example, my systems utilizing different models. It may be possible to choose the highest quality recommendation or recommendation set by incorporating observed data into the selection process. However, again, the difficulty in updating each of the equations used to provide the various sets quickly becomes cumbersome and impractical. Therefore, a need exists to separate a recommendation system into smaller sub-systems such that it is able to accommodate new data streams more programmatically, without modifying the entire system.

Therefore, a need exists for a system and method enabling recommendations to be selected based on past performance of the model or models used to provide the recommendations.

SUMMARY

The above and other needs are met by the disclosed embodiments which provide systems and methods for providing targeted content. Some of the solutions provided utilize a hierarchical predictive projection that is fundamentally different from the classification analyses that have previously been used to address the problems associated with selecting targeted content. Whereas classification solutions are useful in identifying a subject, they are not as effective in predicting valuable associations between the content available to be provided and the attributes of the target. An example of a classification solution is "this user is from New York." An example of a hierarchical predictive projection is "this user is likely to be interested in tickets to see the New York Yankees."

In one example, the disclosed embodiments solve these problems, at least in part, by utilizing an arrangement that provides targeted content. The arrangement includes one or more data repositories storing information from which targeted content may be selected. The one or more data repositories further store information including at least one contextual relationship graph. The arrangement also includes an input/output interface through which a request for targeted content is made, wherein said request includes request-associated attributes. Further, the arrangement includes a controller that receives the request for targeted content through the input/output interface and selects targeted content using the request-associated attributes and at least one contextual relationship graph, wherein the controller further provides the selected targeted content through said input/output interface.

In another example, the disclosed embodiments solve these problems, at least in part, utilizing a computer-readable medium having computer-executable instructions for selecting targeted content using a controller in an arrangement, the computer-executable instructions performing the steps of: receiving, in the arrangement, a request for targeted content including request-associated attributes; and using a controller to select targeted content from one or more data repositories, wherein selecting targeted content includes utilizing, in the selection process, the request-associated attributes and at least one contextual relationship graph related to the information from which targeted content may be selected.

In yet another example, the disclosed embodiments solve these problems, at least in part, by a method of selecting targeted content via an arrangement, the method including the steps of: receiving, in the arrangement, a request for targeted content including request-associated attributes; and without human intervention, selecting targeted content from one or more data repositories, wherein selecting targeted content includes utilizing, in the selection process, the request-associated attributes and at least one contextual relationship graph related to the information from which targeted content may be selected.

In a further example, the disclosed embodiments solve these problems, at least in part, by utilizing an arrangement for determining the relative strength of a classification for a group of words. The arrangement includes memory for storing a contextual relationship graph for a classification, wherein the contextual relationship graph includes a plurality of keywords and data regarding the relationship between each of the plurality of keywords. The arrangement also includes a processor that receives the contextual relationship graph and a plurality of words to be analyzed by said processor, identifies occurrences of the relationships identified in the contextual relationship graph and determines the relative strength of classification based on the identified occurrences.

In a still further example, the earlier stated needs and others are further met by still other disclosed embodiments that enable a computer-readable medium having computer-executable instructions for determining the relative strength of a classification for a group of words, the computer-executable instructions causing the arrangement to perform the steps of: receiving, in the arrangement, a contextual relationship graph for a classification and a plurality of words to be analyzed; identifying occurrences of the relationships identified in the contextual relationship graph; and determining the relative strength of classification based on the identified occurrences.

In another example, the earlier stated needs and others may further be met by a method of discovering and assigning data regarding contextual content of a group of words via an arrangement, the method comprising the steps of: receiving, in the arrangement, a contextual relationship graph for a classification and a plurality of words to be analyzed; identifying occurrences of the relationships identified in the contextual relationship graph; and determining the relative strength of classification based on the identified occurrences.

Other solutions provided utilize targeting information to provide relevant non-competitive advertisements across retailers. For example, in one example, the above needs are met by selecting personalized non-competitive electronic advertising from a plurality of competitive and non-competitive advertisements by: generating a selection model based on product data and user behavior, wherein the selection model includes a plurality of data sets identifying similar and popular products and a rule set for identifying non-competitive advertisements; generating a user model including user data and user specific activity data where such data includes at least data related to a specific retailer; and selecting non-competitive personalized electronic advertising from the plurality of advertisements using the selection model and user model to identify relevant advertisements and using the rule set for identifying advertisements not competitive to the specific retailer. Product data refers to a product entity, any potential child- or sub-products, any of its attributes and any behavioral information associated with this product. User data refers to a customer of said retailer and their associated attributes. These attributes may include the e-mail address of the user or any demographic information, such as zip-code, address, age, gender, etc.

In another example, the above stated needs are met by selecting personalized non-competitive electronic advertising from a plurality of competitive and non-competitive advertisements for electronic display comprising the steps of: generating a selection model, wherein the selection model includes a plurality of data sets identifying similar and popular products and a rule set for identifying non-competitive advertisements; generating a user model including user data and user specific activity data; selecting personalized non-competitive electronic advertising from the plurality of advertisements using the selection model and user model to identify relevant advertisements and using the rule set for identifying non-competitive advertisements; and providing in an electronic format one or more identified relevant and non-competitive advertisements relating to products offered by one or more retailers, wherein the provided electronic format is affiliated with an originating retailer, where such originating retailer is not among the one or more retailers.

In another example, the above stated needs are met by generating a selection model to be used in providing personalized non-competitive advertising comprising the steps of collecting data from one or more retail websites regarding product data; collecting data from the one or more retail websites regarding user behavior; generating a selection model based on the product data and the transactional data, wherein the selection model includes a plurality of data sets identifying similar and popular products; and using the selection model to generate personalized non-competitive advertisements for presentation to one or more of the users for which user behavior has been collected. Transactional data should be understood to be any data associated with a site-interaction, and at least a reference to the user (e.g., a user id) and a reference to a particular product (e.g., a product id). Transactional data can also include other attributes such as price, tax, quantity, date-time, transaction-type (add-to-cart, purchase, return) etc.

In another example, the above stated needs are met by generating a user model to be used in providing personalized non-competitive advertising to a specific user comprising the steps of: collecting data regarding the specific user's identification; collecting data regarding the specific user's activity; generating a user model for the specific user utilizing the user data and activity data; and using the model to generate personalized non-competitive advertisements for presentation to one or more of the users for which user identification and user activity has been collected.

In another example, the above stated needs are met by identifying a subset of users for which an advertisement is relevant comprising the steps of: generating a plurality of user models, which each user model including user data and user specific activity data; identifying a subset of the plurality of user models by applying an advertisement-specific selection model to the plurality of user models to identify users for which the specific advertisement is relevant; and applying a non-competitive rule set to the identified subset of user models to identify which user models are associated with one or more non-competitive originating retailers.

Still other solutions provided utilize targeting information to provide cooperative advertisements for retailers. Other solutions provided utilize targeting information to provide relevant non-competitive advertisements across retailers. In one example, the above needs are met by providing cooperative electronic advertising comprising the steps of: generating a plurality of user models, wherein each user model is associated with an originating retailer; receiving a request to advertise one or more products related to a set of products which are sold by one or more of the retailers; identifying a subset of the plurality of user models by applying an advertisement-specific selection model to the plurality of user models to identify users for which the specific electronic advertising is relevant; and communicating the specific electronic advertising to the identified plurality of users for which the specific electronic advertising is relevant such that each user receives a communication that appears to have been sent by the originating retailer associated with each user model.

In yet another example, the above needs are met by providing self-service cooperative electronic advertising comprising the steps of: generating a plurality of user models, wherein each user model is associated with an originating retailer; receiving from a user, who may or may not be associated with any originating retailers, an electronic advertisement related to a one or more products which are sold by one or more of the originating retailers; receiving from a user parameters of an advertisement-specific selection model; identifying a subset of the plurality of user models using the specific advertisement selection model; and communicating the electronic advertising to the identified plurality of users for which the specific electronic advertising is relevant such that each user receives a communication that appears to have been sent by the originating retailer associated with each user model.

Other solutions are directed towards systems and methods wherein recommendation systems may be adapted to meet evolving business needs. In an example, the above needs are met by providing a method of incorporating product recommendation boosting in an automated recommendation system comprising the steps of: receiving recommendation boost instructions; receiving a request for one or more recommendations; receiving a set of recommendations from one or more automated recommendation systems, wherein each recommendation system utilizes one or more selection models or user models; and modifying the set of product recommendations according to the recommendation boost instructions.

In another example, the above needs are met by providing a computer-readable medium having computer-executable instructions for incorporating product recommendation boosting in an automated recommendation system, the computer-executable instructions causing the system to perform the steps of: receiving recommendation boost instructions; receiving a request for one or more recommendations; receiving a set of recommendations from one or more automated recommendation systems, wherein each recommendation system utilizes one or more selection models or user models; and modifying the set of product recommendations according to the recommendation boost instructions.

In a further example, the above needs are met by providing an arrangement for incorporating product recommendation boosting in an automated recommendation system comprising: a controller that receives recommendation boost instructions; receives a request for one or more recommendations; receives a set of recommendations from one or more automated recommendation systems, wherein each recommendation system utilizes one or more selection models or user models; and modifies the set of product recommendations according to the recommendation boost instructions.

Other solutions are directed towards systems and methods for providing a user an interface for incorporating boosting into a recommendation system. In an example, the above needs are met by providing a method of incorporating product recommendation boosting in an automated recommendation system comprising the steps of: presenting a user with a visual electronic interface adapted to receive recommendation boost instructions regarding a boost subject; receiving recommendation boost instructions via the visual electronic interface, wherein the recommendation boost instructions indicate how strongly the boost subject should be recommended or suppressed from being recommended; receiving a set of recommendations from one or more automated product recommendation systems, wherein each recommendation system utilizes one or more selection models or user models; and modifying the set of recommendations according to the recommendation boost instructions.

In another example, the above needs are met by providing a computer-readable medium having computer-executable instructions for incorporating product recommendation boosting in an automated recommendation system, the computer-executable instructions causing the system to perform the steps of: presenting a user with a visual electronic interface adapted to receive recommendation boost instructions regarding a boost subject; receiving recommendation boost instructions via the visual electronic interface, wherein the recommendation boost instructions indicate how strongly the boost subject should be recommended or suppressed from being recommended; receiving a set of recommendations from one or more automated product recommendation systems, wherein each recommendation system utilizes one or more selection models or user models; and modifying the set of recommendations according to the recommendation boost instructions.

In a further example, the above needs are met by providing an arrangement for incorporating product recommendation boosting in an automated recommendation system comprising: a visual electronic interface adapted to receive recommendation boost instructions regarding a boost subject; and a controller that receives recommendation boost instructions from the visual electronic interface, wherein the recommendation boost instructions indicate how strongly the boost subject should be recommended or suppressed from being recommended; receives a set of recommendations from one or more automated product recommendation systems, wherein each recommendation system utilizes one or more selection models or user models; and modifies the set of recommendations according to the recommendation boost instructions.

Other solutions are directed towards systems and methods for using ensemble learning to improve the selection of recommendations from recommendation systems. In an example, the above needs are met by providing a method of improving product recommendations for a first user comprising the steps of: receiving a request for one or more product recommendations for a first user, each product recommendation being associated with any one of a plurality of retailers; receiving a plurality of recommendation sets from one or more automated product recommendation systems, wherein the plurality of recommendation sets are generated using different selection models; and using ensemble learning to select one or more most relevant product recommendation sets from the plurality of product recommendation sets.

In another example, the above needs are met by providing a computer-readable medium having computer-executable instructions for improving product recommendations for a first user, the computer-executable instructions causing the system to perform the steps of: receiving a request for one or more product recommendations for a first user, each product recommendation being associated with any one of a plurality of retailers; receiving a plurality of recommendation sets from one or more automated product recommendation systems, wherein the plurality of recommendation sets are generated using different selection models; and using ensemble learning to select one or more most relevant product recommendation sets from the plurality of product recommendation sets.

In a further example, the above needs are met by providing an arrangement for improving product recommendations for a first user comprising: a controller that receives a request for one or more product recommendations for a first user, each product recommendation being associated with any one of a plurality of retailers; receives a plurality of recommendation sets from one or more automated product recommendation systems, wherein the plurality of recommendation sets are generated using different selection models, and uses ensemble learning to select one or more most relevant product recommendation sets from the plurality of product recommendation sets.

In yet another example, the above needs are met by providing a method of improving user set recommendations for product advertising comprising the steps of: receiving a request for user set recommendations from any of a set of retailers where such request is related to one or more products; receiving from a plurality of user sets from one or more automated user recommendation systems, wherein the plurality of user sets are generated using different user models; and using ensemble learning to select one or more most relevant user sets from the plurality of user sets.

In still another example, the above needs are met by providing a computer-readable medium having computer-executable instructions for improving user set recommendations for product advertising, the computer-executable instructions causing the system to perform the steps of: receiving a request for user set recommendations from any of a set of retailers where such request is related to one or more products; receiving from a plurality of user sets from one or more automated user recommendation systems, wherein the plurality of user sets are generated using different user models; and using ensemble learning to select one or more most relevant user sets from the plurality of user sets.

In a further example, the above needs are met by providing an arrangement for improving product recommendations for a first user comprising: a controller that receives a request for user set recommendations from any of a set of retailers where such request is related to one or more products, receives from a plurality of user sets from one or more automated user recommendation systems, wherein the plurality of user sets are generated using different user models, and uses ensemble learning to select one or more most relevant user sets from the plurality of user sets.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 8 is a flow chart depicting a process for identifying a subset of users for which a non-competitive advertisement is relevant.

FIG. 9 is a flow chart depicting a process for providing cooperative electronic advertising.

FIG. 11 is a flow chart depicting a process for

FIG. 17 is a flow chart depicting a process for using ensemble learning to improve user set recommendations for product advertising

DETAILED DESCRIPTION OF THE PREFERRED EMBODIMENTS

Figure 1:
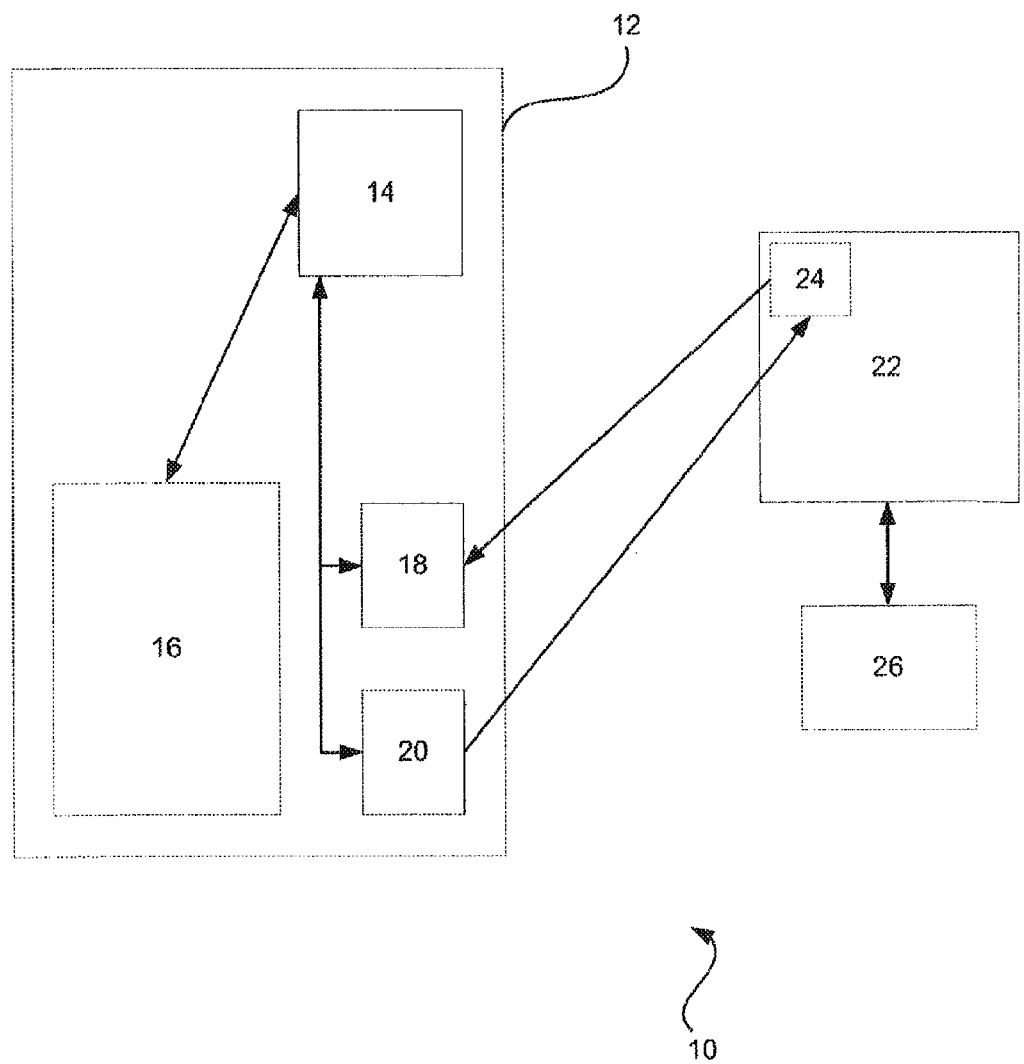
FIG. 1 is a schematic of a system for providing targeted content.

It is contemplated that the subject matter described herein may be embodied in many forms. Accordingly, the embodiments described in detail below are the presently preferred embodiments, and are not to be considered limitations.

The disclosed embodiments address problems related to providing targeted content. The disclosed embodiments solve these problems, at least in part, by utilizing an arrangement that provides targeted content. The arrangement includes one or more data repositories storing information from which targeted content may be selected. The one or more data repositories further store information including at least one contextual relationship graph. The arrangement also includes an input/output interface through which a request for targeted content is made, wherein said request includes request-associated attributes. Further, the arrangement includes a controller that receives the request for targeted content through the input/output interface and selects targeted content using the request-associated attributes and at least one contextual relationship graph, wherein the controller further provides the selected targeted content through said input/output interface.

The earlier stated needs and others are met by still other disclosed embodiments that enable a computer-readable medium having computer-executable instructions for selecting targeted content using a controller in an arrangement, the computer-executable instructions performing the steps of: receiving, in the arrangement, a request for targeted content including request-associated attributes; and using a controller to select targeted content from one or more data repositories, wherein selecting targeted content includes utilizing, in the selection process, the request-associated attributes and at least one contextual relationship graph related to the information from which targeted content may be selected.

The earlier stated needs and others may further be met by a method of selecting targeted content via an arrangement, the method includes the steps of: receiving, in the arrangement, a request for targeted content including request-associated attributes; and without human intervention, selecting targeted content from one or more data repositories, wherein selecting targeted content includes utilizing, in the selection process, the request-associated attributes and at least one contextual relationship graph related to the information from which targeted content may be selected.

Moreover, the disclosed embodiments solve these problems, at least in part, by utilizing an arrangement for determining the relative strength of a classification for a group of words. The arrangement includes memory for storing a contextual relationship graph for a classification, wherein the contextual relationship graph includes a plurality of keywords and data regarding the relationship between each of the plurality of keywords. The arrangement also including a processor that receives the contextual relationship graph and a plurality of words to be analyzed by said processor, identifies occurrences of the relationships identified in the contextual relationship graph and determines the relative strength of classification based on the identified occurrences.

The earlier stated needs and others are further met by still other disclosed embodiments that enable a computer-readable medium having computer-executable instructions for determining the relative strength of a classification for a group of words, the computer-executable instructions causing the arrangement to perform the steps of: receiving, in the arrangement, a contextual relationship graph for a classification and a plurality of words to be analyzed; identifying occurrences of the relationships identified in the contextual relationship graph; and determining the relative strength of classification based on the identified occurrences.

Also the earlier stated needs and others may further be met by a method of discovering and assigning data regarding contextual content of a group of words via an arrangement, the method comprising the steps of receiving, in the arrangement, a contextual relationship graph for a classification and a plurality of words to be analyzed; identifying occurrences of the relationships identified in the contextual relationship graph; and determining the relative strength of classification based on the identified occurrences.

FIG. 1 illustrates a system for providing targeted content 10 in which an arrangement 12 includes a controller 14 that controls one or more data repositories 16, a receiver module 18 and a transmitter module 20. In the example shown in FIG. 1, the arrangement 12 is an arrangement of a plurality of electronic devices and more specifically a linearly scalable computing system, such as, for example a stateless cluster of servers behind a load balancer that communicate with an associated cluster of data repositories. However, it is understood that the arrangement 12 may be accomplished using any number of systems and devices.

As described above, the arrangement 12 includes a controller 14. The controller 14 is described in greater detail below. However, generally and typically, the controller 14 is an integrated circuit including a central processing unit (CPU), input/output interfaces, other communication interfaces, memory, a clock generator and one or more peripherals. As used in the examples provided herein, the controller 14 may be a hardware component or a software component. For example, in one example, the controller 14 may be one or more microprocessors for controlling the arrangement 12. It is contemplated that the controller 14 used to accomplish the solutions provided herein may be embodied in one or more controllers 14. Accordingly, any use of the term controller herein is understood to refer to one or more controllers 14.

The controller 14 may be embedded in the arrangement 12. In the solution shown in FIG. 1, the controller 14 may be a microcontroller, or microprocessor, embedded in a scalable computing system. Accordingly, the controller 14 may be responsible for managing and controlling the operation of the arrangement 12 in which it is embedded. However, in the solutions provided herein, the controller 14 is primarily responsible for providing targeted content, as will be described in further detail below.

The one or more data repositories 16 shown in FIG. 1 may be embodied in one or more memory devices. The data repositories 16 may be any type of data storage devices, such as, for example, one or more databases. However, the solutions provided herein are not tied to any specific class of data storage, such as, for example, traditional relational databases.

The receiver module 18 and the transmitter module 20 shown in FIG. 1 may be any type of input and output devices for communicating with other arrangements, for example, through a network communication system. The receiver module 18 and the transmitter module 20 shown in FIG. 1 are just one example of the various input/output interfaces that may be utilized in the solutions provided herein. The receiver module 18 and transmitter module 20 are used to communicate with other devices as is described further below. Accordingly, the receiver module 18 and transmitter module 20 may be embodied in any type of communication device or devices that enable communication between arrangements, whether the arrangements are directly connected, connected through a network or otherwise in communication.

In the solution shown in FIG. 1, the system for providing targeted content 10 is a system in which targeted advertising is provided to viewers of a web page 22. However, it is understood that the system 10 described herein may be employed to provide any type of targeted content to any type of arrangement, electronic device or system. For example, the targeted content may be advertising, promotional offers, multimedia content, interactive content, news or other stories, service announcements, binary data (such as executables), a confluence of the above, etc. The targeted content may be provided to a standalone system (i.e., these systems may co-exist on the same system) networked computer, a mobile device, such as, for example, a cell phone, a television, a display, an appliance, a print device, electronic paper, etc. For example, the solutions provided herein may allow a web page 22 to play targeted audio content, such as music, that is appropriate contextually within the web page 22 as well as being targeted to a specific user 26.

As described above, the system for providing targeted content 10 shown in FIG. 1 provides targeted advertisements to web page viewers. In such an example, a web page 22 is provided with a targeted content request script 24 (i.e., a request widget). When a user 26 access the web page 22, the targeted content request script 24 makes a call to the system for providing targeted content 10 to receive a targeted advertisement based on the attributes of the web page 22, the attributes of the user 26 and the attributes associated with the user's request. The system for providing targeted content 10 then utilizes the attributes of the advertisements, from which the targeted content will be selected, as well as the attributes of the web page 22, the attributes of the user 26 and the attributes associated with the user's request to determine which advertisement or advertisements to provide to the user 26. The attributes of the advertisements, the web page 22, the user 26 and the user's request may include contextual attributes, profile attributes and behavioral attributes.

In the context of the targeted content request script 24 call in the solution shown in FIG. 1, contextual attributes may include, for example, attributes of the web page such as, keywords related to the webpage, the web site's URL, the web page's URL, the page/site hierarchy (derived from URL-patterns or URL-patterns per content-type), the web page creation date, the date the targeted content request script 24 was embedded in the web page, the web page content (e.g., whether the content has changed since the last call was processed, how frequently the content changes, string and tack graphs as described further below, etc.), the web page context (e.g., web page meta data, learned context based on historical user activity, etc.), etc. However, it is understood that the contextual attributes may include any attributes used to identify the location and/or context in which the targeted content will be provided.

In the context of the targeted content request script 24 call in the solution shown in FIG. 1, profile attributes may include, for example, the user's IP address, the number of page visits by the user, the number of site visits in which the targeted content request script 24 is embedded (i.e., tracks the user 26 across a number of web sites), general activity based relationships, click-though history, page view history, purchase history, the user's time zone, targeted content previously provided to the user 26, etc. Further, profile attributes may be stored in the data repositories 16 for reference by the system 10. For example, the email address of the user 26, or other unique identification, may be stored in the data repositories 16 and be associated with a set of attributes also stored in the data repositories 16. However, it is understood that the profile attributes may be any attributes used to identify the intended recipient of the targeted content.

In the context of the targeted content request script 24 call in the solution shown in FIG. 1, behavioral attributes may include, for example, conditional probability behavior and other learned features. For example, conditional probability behavior may be probable behavior based on an analysis of sets of users, whereas the other learned features may include Bayesian attributes whereby system feedback rewards and penalizes targeted content recommendations, neural networks, collaborative filtering, etc. For example, targeted content that elicits the desired response may send information back into the system for providing targeted content 10 to reinforce the recommendation whereas targeted content that does not elicit the desired response may send information back into the system for providing targeted content 10 to penalize the recommendation. However, it is understood that the behavioral attributes may be any attributes that may be helpful in understanding the probability of sets of users' actions to further increase the effectiveness of the targeted content.

As described above, the system for providing targeted content 10 receives the attributes of the web page 22, the attributes of the user 26 and other attributes associated with the user's request, which will be used to determine which advertisement or advertisements to provide to the user 26. The system for providing targeted content 10 uses the attributes received from the web page 22 and information stored in the data repositories to select targeted content to be provided to the user 26, as described further below. The information stored in the data repositories 16 may include location graphs that include keywords associated with a location in which targeted content may be requested. These location graphs may be compiled online or offline and with or without human intervention.

In addition to the contextual, profile and behavioral attributes described above, the system for providing targeted content 10 utilizes, in part, contextual relationships to select the content to be provided in response to a request for targeted content. As will be described further below, contextual relationships may be based on, for example, relationships between word meanings, distances between related words, punctuation, formatting, etc. Contextual relationships may be determined and utilized in the analysis of the content to be provided and the context in which the content is to be displayed, for example, the web page 22.

Examples of utilizing contextual relationships in the system for providing targeted content 10 include using contextual relationship graphs, such as, for example, content graphs (i.e., keywords and relationships related to the specific content available to be provided), category graphs (i.e., relationships between the general categories in which the specific content may be grouped) and/or content/category graphs (i.e., relationships between the categories and the contents) in conjunction with a string and tack process (described further below) to select targeted content to be provided to the user 26. The content graphs, category graphs and content/category graphs may be developed in online or offline processes and with or without human intervention. The various contextual relationship graphs may be stored in the data repositories 16.

The contextual relationship graphs described herein and utilized by the arrangement 10 described herein are hierarchically structured graphs in which some edges are directional and define parent and child relationships, or in which, for some edges, one node contributes to the definition of the other node. Accordingly, the use of the term hierarchically structured is not limited to linearly hierarchically structures.

In the solution provided and described with respect to FIG. 1, content graphs may be created based on a vendor's catalog. In an example wherein the system for providing targeted content 10 provides targeted links to an online vendor's products on the web page 22, the content graphs may be created by first downloading an initial catalog of products from the vendor. The initial catalog may then be normalized into individual content graphs by identifying the attributes (values with known meanings, such as, for example, "price") and keywords (values associated with a product without known meaning) from the titles and descriptions of each product and its respective category. Attributes may be of the form of hierarchical (such as "product category"), regional (such as "similar to"), discrete (such as "color"), or continuous/numerical (such as "price"). The normalization of content data increases the efficiency and effectiveness of the solutions provided herein.

In the solution provided and described with respect to FIG. 1, the category graphs may include information describing the relationships between the various categories. For example, the relationships may be defined in three categories: (i) is the same as; (ii) is parent of and (iii) has the same children. These relationships describe how the categories relate to each other. For example, if "basketball" is a subcategory of "books" and "basketball" is also a subcategory of "tickets," the children of "books" and "tickets" may be related even if they don't share other attributes. Alternatively, the relationships may be otherwise defined by a greater or fewer number categories or using other categories entirely.

In the solutions provided and described with respect to FIG. 1, the content/category graphs may include information describing the relationships between each of the respective products and associated attributes.

It is contemplated that the product graphs, category graphs and content/category graphs may exist as any number of individual or combined graphs. For example, the content/category graph may be part of the product graph as opposed to being a separate file or data structure.

It will be understood by the descriptions herein that the contextual relationship graphs may each relate to a classification, whether it be a product, category or a relationship between products and categories, such that the contextual relationship graph may be used to determine how strongly certain content or text corresponds to a particular classification by evaluating the strength of the relationships identified in the graph as compared to those relationships in the content being evaluated.

In the solution provided in FIG. 1, in response to a request to provide targeted content, the controller 14 directs a process to discover the relationship between the environment in which the content will be provided (i.e., the web page 22) and the content from which the targeted content will be selected. The process may be carried out online and in real-time. The following is an example of a process that may be used to select targeted content. It is understood that the following in merely one embodiment of a process that may be employed and that other processes may be used to select targeted content.

The process described herein is a method of determining the context of an environment in which targeted content is to be provided by analyzing the text located within that environment, such as, for example, the text located on the web page 22. However, it is understood that a similar process may be used to determine the context of an environment by analyzing images, audio content, or any other multimedia content.

The process employed in the solution provided in FIG. 1 is as follows. First, the targeted content request script 24 is incorporated into the web page 22. This step may include associating keywords with the web page 22 that will be communicated to the arrangement 12 when the request for targeted content is made. The association may be formed by the operator of the web page 22, by the operator of the arrangement 12 or in any other manner. When the user 26 accesses the web page 22, the targeted content request script 24 calls the arrangement 12. The call may include transmitting to the arrangement 12 any associated keywords, any location graphs stored by the web page 22, the attributes of the web page 22 (including the web page URL or the text of the web page), the attributes of the user 26 and the attributes associated with the user's request. Upon receiving the request to provide targeted content, the controller 14 accesses any location graphs stored in the data repositories 16, which may provide additional information used to select targeted content. It should be noted that, although in this example the request is initiated from outside of the arrangement 10, the request may be initiated from within the system. For example, a request may be made to analyze content stored within the data repositories 16. It should be further noted that the text to be analyzed may be from any source, such as, for example, the web page 22, a periodical, user-selected words, etc.

At this point, the controller 14 accesses each of the category graphs stored in the data repository 16 relating to content that may be selected as the targeted content. The keywords associated with each category graph are then compared to the text being analyzed and any occurrence of a keyword is identified and scored. For example, each category graph may have one unit added to its score value for each occurrence of an associated keyword. Scored may be positive for positive relationships and negative for negative relationships. Each category may be given further points to be added to the score based on the sum of the log of each of the keywords identified in the category's children categories' scores, or the sum of the fraction of each of the keywords identified in the category's children categories' scores or other such aggregation method. Alternatively, the scoring may be otherwise configured, for example, to include weighted scoring. For each relevant category in which a keyword has been identified or the score exceeds a given value, the product graphs related to that category may then be analyzed. For example, for each class of products (tickets, books, etc.) that receives a positive score, each of the product graphs within that class will be scored for keyword occurrences. Again, these scores may be based on keyword matches. Each relevant product graph, for example, each product graph including a keyword occurring in the web page 22, represents a product that may be selected to be provided as the targeted content.

The set of product graphs is further optimized by filtering the set using the attributes of the web page 22, the attributes of the user 26 and the attributes associated with the user's request. The results may further be filtered using any other contextual attributes, profile attributes and behavioral attributes, including user behavior feedback in which product graphs may be filtered out of the process based on low click through rates or other learned information that is collected and fed back into the system for providing targeted content 10. Furthermore, the graphs may be filtered using manual rules. Examples of learned feedback may include learning new product attributes and relationships, learning web page relationships and learning new keywords to be associated with category graphs. Further, collaborative filtering, or other closed loop feedback, may be utilized. For example, a variety filter may be employed such that the variety filter may remove content from the selection process that has been previously selected for the user 26 within a specified time frame.

The controller 14 then selects the highest rated product graph and displays targeted content related to that product graph, for example, a link to a vendor's web site selling the product associated with the highest rated product graph.

Complex scoring methods may be employed using location graphs, product graphs, category graphs and product/category graphs. For example, a string and tack scoring process may be employed. An example of a string and tack scoring method is provided as follows:

The category graphs may include the following categories:
  i. Sports→Baseball→Major League→National League→SF Giants
  ii. Sports→Baseball→History
  iii. Etc.

The keyword set might be:
  i. Baseball
  ii. California
  iii. San Francisco
  iv. Etc.

Although "San Francisco" is two words, the term keywords, as used herein, may encompass both words and phrases. Accordingly, in this example, the two words "San Francisco" are treated as a single keyword.

Using these sets of keywords the following content may be analyzed:

"Xxxx Giants xxxx xxxx California, xxx xxx. Xxxxx xx New York. Xxxxx xxxxx Baseball xxx San Francisco."

The analysis of the above content using the given keywords may return a graph illustrating the distances between the defined keywords. Conceptually, this graph may appear as follows:

| Location (word order) | Word |
|---|---|
| 2 | Giants |
| 5 | California |
| 14 | Baseball |
| 16 | San Francisco |

Accordingly, a matrix can be built that would appear as follows:

|  | Giants | California | Baseball | San Francisco |
|---|---|---|---|---|
| Giants | 0 | 3 | 12 | 14 |
| California | 3 | 0 | 9 | 11 |
| Baseball | 12 | 9 | 0 | 2 |
| San Francisco | 14 | 11 | 2 | 0 |

As can be seen, only the top half of this matrix is needed and the data may be compiled and/or stored in a matrix as follows:

|  | Giants (1) | California (2) | Baseball (3) | San Francisco (4) |
|---|---|---|---|---|
| Giants (1) | X | 3 | 12 | 14 |
| California (2) | X | x | 9 | 11 |
| Baseball (3) | X | x | X | 2 |
| San Francisco (4) | X | x | X | x |

It may be further determined that any distance greater than 12 words is irrelevant. As a result, the following sparse matrix would result:

|  | Giants (1) | California (2) | Baseball (3) | San Francisco (4) |
|---|---|---|---|---|
| Giants (1) | X | 3 | 12 | x |
| California (2) | X | x | 9 | 11 |
| Baseball (3) | X | x | X | 2 |
| San Francisco (4) | X | x | X | x |

This sparse matrix can instead be represented by indexes as follows:
  i. {1,2}
  ii. {1,3}
  iii. {1,2,3}
  iv. {2,3}
  v. {2,4}
  vi. {2,3,4}
  vii. {3,4}

If a particular set, or subset were to appear more than once, it could be weighted to so reflect. The indexes created can then be used in the scoring and weighting of the product graphs and category graphs to be used in the process described above or other selection processes.

The selection process described herein may be one step in a broader process. For example, the process may be employed a first time to identify a category from which the targeted content will be selected, a second time to determine a choice set of content from the selected category from which to select the targeted content and a third time to select one of the items in the choice set based on, for example, collaborative filtering. In any case, the solutions provided herein may be utilized as a sub-algorithm within a larger algorithm in any manner as may be apparent.

A further example is provided to demonstrate how, in addition to identifying first order relationships between text and contextual relationship graphs, the solutions provided herein may be used to determine second order or higher relationships as well. For example, the keywords or attributes included in a contextual relationship graph may be referred to as nodes. Nodes may be related to each other through positive or negative relationships and the relationships may be weighted for various reasons, including distance between nodes in the text being analyzed (e.g., distance may be defined by the number of words, characters, special characters, sentences, etc. between identified nodes) and/or the clustering/relationship of nodes within contextual relationship graph structures.

Nodes are not exclusive to any particular contextual relationship graph. Multiple graphs may incorporate the same node or nodes. The entire collection of nodes may form what is known as a power set. Accordingly, a simultaneous analysis of all potentially relevant contextual relationship graphs may be accomplished by performing an analysis of the power set of nodes. Since the collection of graphs may be contained in the same data repository 16 as the nodes, the data structures may be efficiently provided and utilized. This sharing of nodes allows the relationships between contextual relationship graphs to be defined. Additionally, when two or more graphs share nodes, the set of shared nodes may define an additional contextual relationship graph that can be used to determine the overall context of the content being examined.

For example a set of words that comprise the content being analyzed may include the following words (assuming the relationships between the words allow for the graphs described below): Charlie Batch; Troy Polamalu; Santonio Holmes; USC; Eastern Michigan; and Ohio State. The solutions provided herein may return first order relationship results identifying contextual relationship graphs for each of these players, which include nodes identifying the players and their alma maters. Additionally, the solutions provided herein may further determine second order (or higher) relationships as well. For example, using the nodes provided above, the arrangement 10 may determine that a commonality between each of the first order contextual relationship graphs is the "Pittsburgh Steelers" node, it may be deduced that the core contextual relationship graph, and therefore, the classification of the text being analyzed, is the Pittsburgh Steelers graph. Determining these types of second or third order relationships allows the arrangement to make stronger recommendations, such as, in this example, recommending Steelers tickets to the user 26 instead of a Charlie Batch Eastern Michigan jersey.

The analysis of text, keywords, nodes, etc. described herein is typically most effective when the analysis is performed on a power set. A power set is the set of all possible combinations of the individual elements within the set, a union of all subsets. Accordingly, analysis of the power set enables concurrent, or effectively concurrent, analysis of each of the variables, and each of the sets of variables, in every level of dependence and independence of the other variable and sets of variables.

Figure 2:
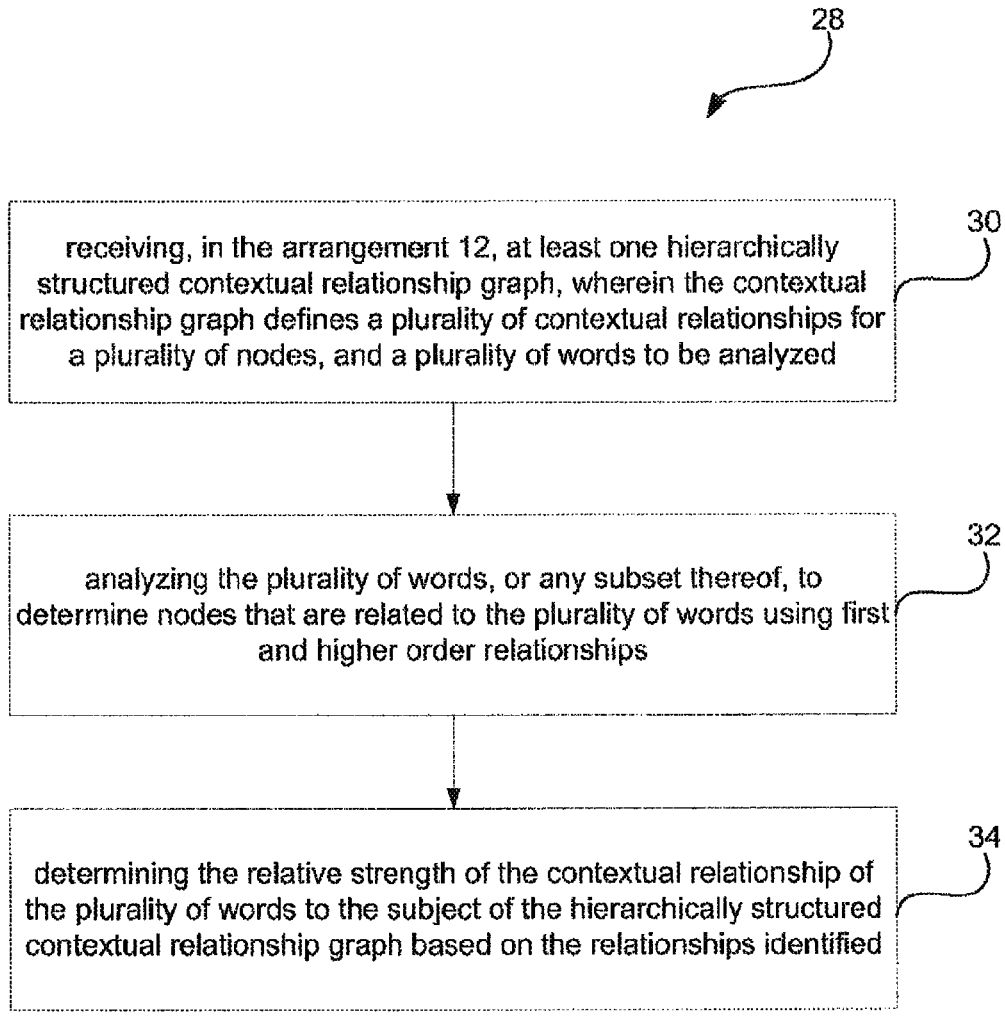
FIG. 2 is a flow chart depicting a method of discovering and assigning data regarding contextual content of a group of words via an arrangement.

FIG. 2 illustrates an example of a method 28 for discovering and assigning data regarding contextual content of a group of words via an arrangement 12, as described above with respect to a string and tack process. The method 28 may be embodied in the system 10 described above with respect to FIG. 1. Accordingly, the description provided above with respect to the system 10 is applicable to the method described herein. The first step 30 shown in FIG. 2 is receiving, in the arrangement 12, at least one hierarchically structured contextual relationship graph, wherein the contextual relationship graph defines a plurality of contextual relationships for a plurality of nodes, and a plurality of words to be analyzed. The second step 32 shown in FIG. 2 is analyzing the plurality of words, or any subset thereof, to determine nodes that are related to the plurality of words using first and higher order relationships. The third step 34 is determining the relative strength of the contextual relationship of the plurality of words to the subject of the hierarchically structured contextual relationship graph based on the relationships identified.

Figure 3:
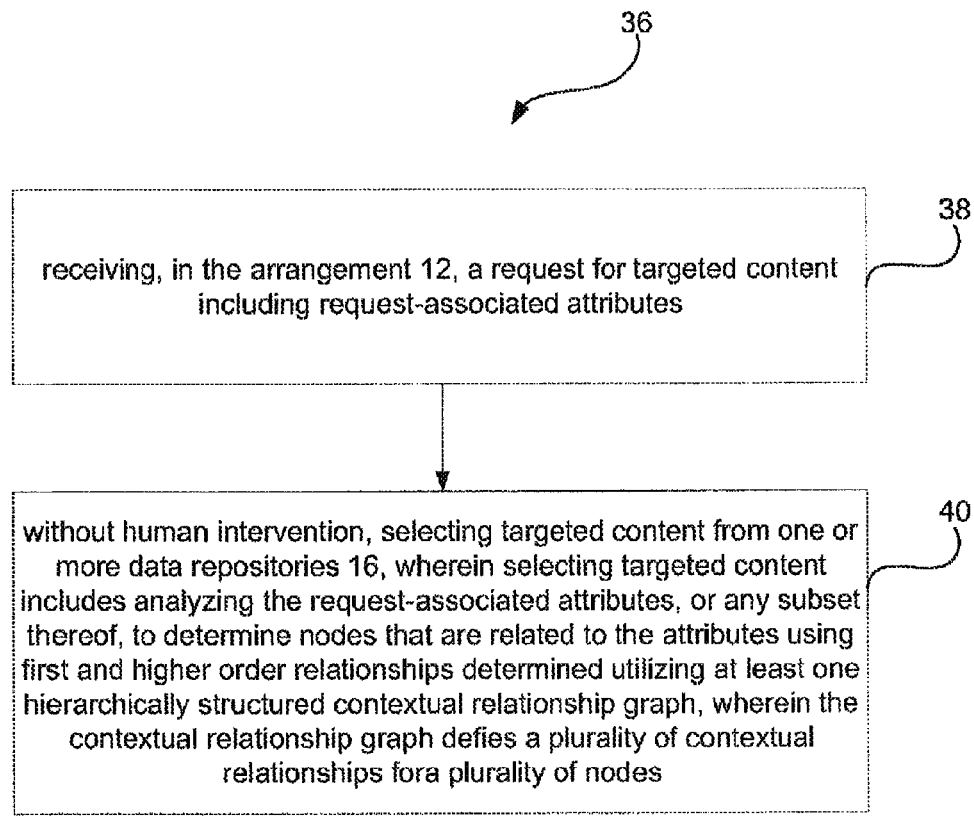
FIG. 3 is a flow chart depicting a method for providing targeted content.

FIG. 3 illustrates an example of a method 36 for selecting targeted content via an arrangement. The method 36 may be embodied in the system 10 described above with respect to FIG. 1. Accordingly, the description provided above with respect to the system 10, is applicable to the method described herein. The first step 38 shown in FIG. 3 is receiving, in the arrangement 12, a request for targeted content including request-associated attributes. The second step 40 shown in FIG. 3 is, without human intervention, selecting targeted content from one or more data repositories 16, wherein selecting targeted content includes analyzing the request-associated attributes, or any subset thereof, to determine nodes that are related to the attributes using first and higher order relationships determined utilizing at least one hierarchically structured contextual relationship graph, wherein the contextual relationship graph defines a plurality of contextual relationships for a plurality of nodes.

As shown, the system 10, methods 28 and 36 and processes described above with respect to the system 10 provide a solution to the challenges in providing targeted content.

The disclosed embodiments address problems related to providing targeted content in non-competitive cross-advertising. The disclosed embodiments solve these problems, at least in part, by selecting personalized non-competitive electronic advertising from a plurality of competitive and non-competitive advertisements by: generating a selection model based on product data and user behavior, wherein the selection model includes a plurality of data sets identifying similar and popular products and a rule set for identifying non-competitive advertisements; generating a user model including user data and user specific activity data where such data includes at least data related to a specific retailer; and selecting non-competitive personalized electronic advertising from the plurality of advertisements using the selection model and user model to identify relevant advertisements and using the rule set for identifying advertisements not competitive to the specific retailer. Product data refers to a product entity, any potential child- or sub-products, any of its attributes and any behavioral information associated with this product. User data refers to a customer of said retailer and their associated attributes. These attributes may include the e-mail address of the user or any demographic information, such as zip-code, address, age, gender, etc.

In another example, the above stated needs are met by selecting personalized non-competitive electronic advertising from a plurality of competitive and non-competitive advertisements for electronic display comprising the steps of: generating a selection model, wherein the selection model includes a plurality of data sets identifying similar and popular products and a rule set for identifying non-competitive advertisements; generating a user model including user data and user specific activity data; selecting personalized non-competitive electronic advertising from the plurality of advertisements using the selection model and user model to identify relevant advertisements and using the rule set for identifying non-competitive advertisements; and providing in an electronic format one or more identified relevant and non-competitive advertisements relating to products offered by one or more retailers, wherein the provided electronic format is affiliated with an originating retailer, where such originating retailer is not among the one or more retailers.

In another example, the above stated needs are met by generating a selection model to be used in providing personalized non-competitive advertising comprising the steps of: collecting data from one or more retail websites regarding product data; collecting data from the one or more retail websites regarding user behavior; generating a selection model based on the product data and the transactional data, wherein the selection model includes a plurality of data sets identifying similar and popular products; and using the selection model to generate personalized non-competitive advertisements for presentation to one or more of the users for which user behavior has been collected. Transactional data should be understood to be any data associated with a site-interaction, and at least a reference to the user (e.g., a user id) and a reference to a particular product (e.g., a product id).

Transactional data can also include other attributes such as price, tax, quantity, date-time, transaction-type (add-to-cart, purchase, return) etc.

In another example, the above stated needs are met by generating a user model to be used in providing personalized non-competitive advertising to a specific user comprising the steps of: collecting data regarding the specific user's identification; collecting data regarding the specific user's activity; generating a user model for the specific user utilizing the user data and activity data; and using the model to generate personalized non-competitive advertisements for presentation to one or more of the users for which user identification and user activity has been collected.

In another example, the above stated needs are met by identifying a subset of users for which an advertisement is relevant comprising the steps of: generating a plurality of user models, which each user model including user data and user specific activity data; identifying a subset of the plurality of user models by applying an advertisement-specific selection model to the plurality of user models to identify users for which the specific advertisement is relevant; and applying a non-competitive rule set to the identified subset of user models to identify which user models are associated with one or more non-competitive originating retailers.

Figure 4:
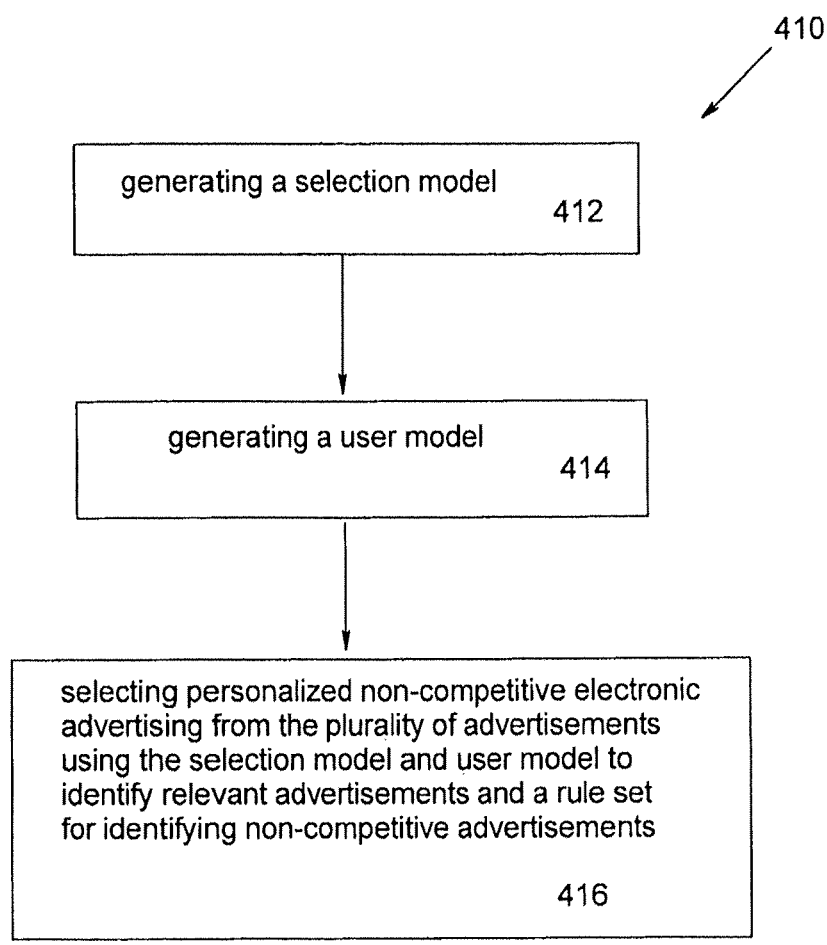
FIG. 4 is a flow chart depicting a process of selecting personalized non-competitive electronic advertising from a plurality of competitive and non-competitive advertisements.
Figure 5:
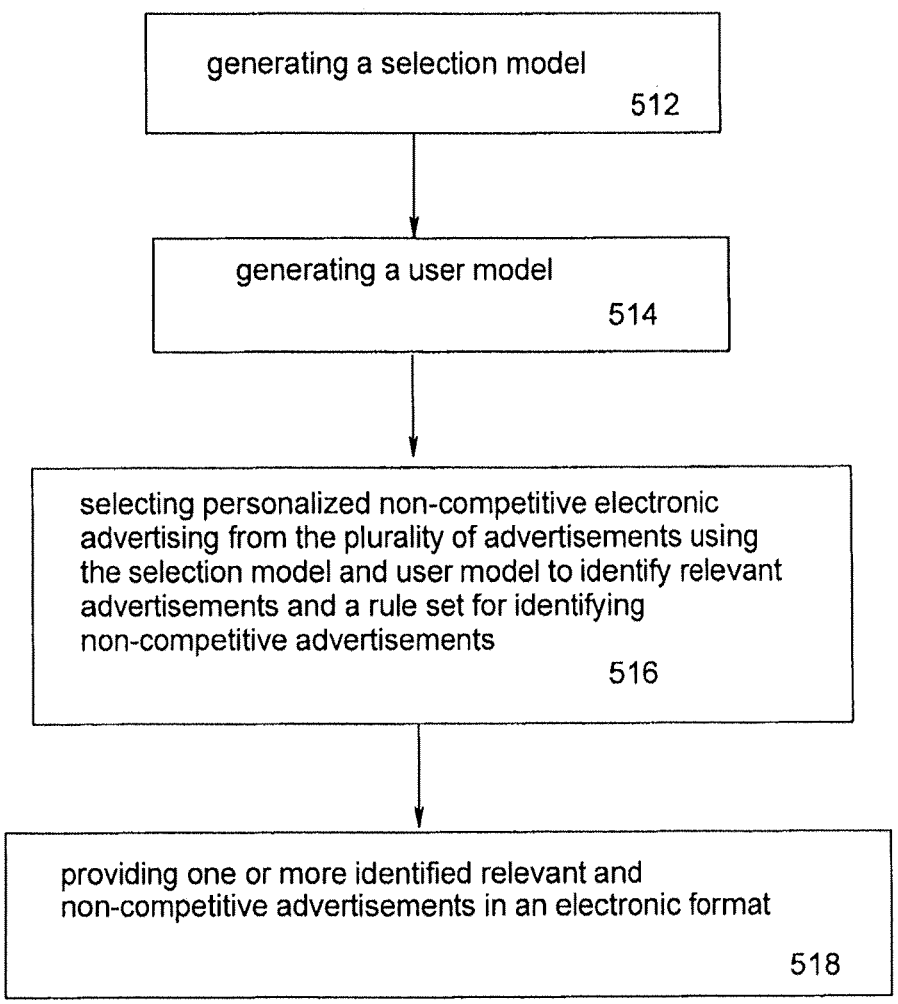
FIG. 5 is a flow chart depicting a process of selecting personalized non-competitive electronic advertising from a plurality of competitive and non-competitive advertisements for electronic display.

FIG. 4 illustrates a process of selecting personalized non-competitive electronic advertising from a plurality of competitive and non-competitive advertisements 410. FIG. 5 illustrates a process of selecting personalized non-competitive electronic advertising from a plurality of competitive and non-competitive advertisements for electronic display 510. The processes described with reference to FIGS. 4 and 5 may be implemented, in one example, using a system for providing targeted content 10 in which an arrangement 12 includes a controller 14 that controls one or more data repositories 16, a receiver module 18 and a transmitter module 20, such as the system 10 described with respect to FIG. 1. However, it is contemplated that other systems 10 may be employed for implementing the processes described herein with respect to FIGS. 4 and 5.

As shown in FIG. 4, the process of selecting personalized non-competitive electronic advertising from a plurality of competitive and non-competitive advertisements 410 includes the steps of: (1) generating a selection model 412; (2) generating a user model 414; and (3) selecting personalized non-competitive electronic advertising from the plurality of advertisements using the selection model and user model to identify relevant advertisements and a rule set for identifying non-competitive advertisements 416.

As shown in FIG. 5, the process of selecting personalized non-competitive electronic advertising from a plurality of competitive and non-competitive advertisements for electronic display 510 includes the steps of: (1) generating a selection model 512; (2) generating a user model 514; (3) selecting personalized non-competitive electronic advertising from the plurality of advertisements using the selection model and user model to identify relevant advertisements and a rule set for identifying non-competitive advertisements 516; and (4) providing one or more identified relevant and non-competitive advertisements in an electronic format 518.

The examples described with reference to FIGS. 4 and 5 refer mainly to examples wherein a relevant, targeted, non-competitive advertisement is provided to the user 26 of a first retailer's website, wherein the advertisement is for goods or services provided by a second retailer. However, it is understood that the solutions provided herein may be accomplished through many different media, including, for example, through networked computers, a mobile device, such as, for example, a cell phone, a television, a display, an appliance, a print device, electronic paper, or any number of non-electronic formats, including printed mailings. The relevance, targeting and non-competitive nature of the advertisement is determined by utilizing user models, selection models and non-competitive rule-sets.

As shown in FIGS. 4 and 5, the first step in the processes includes generating a selection model 412 and 512. A selection model is a model used to analyze targeted content to be provided to a user 26. The selection models may be product graphs, category graphs and content/category graphs as described above with respect to FIGS. 1-3. Alternatively, the selection models may be any other model used to identify targeted content, such as advertisements, from a plurality of content. For example, a process for generating a selection model is described below with respect to FIG. 6.

Figure 6:
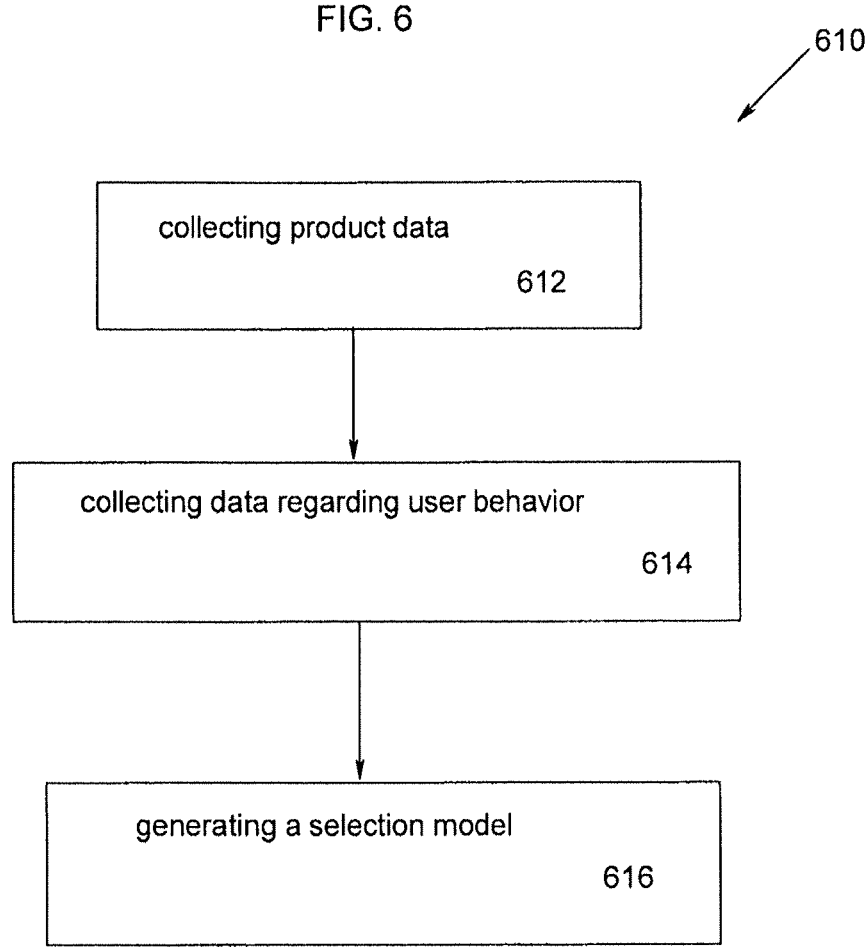
FIG. 6 is a flow chart depicting a process for generating a selection model to be used in providing personalized non-competitive advertising.

FIG. 6 illustrates a process for generating a selection model to be used in providing personalized non-competitive advertising 610. As shown in FIG. 6, the process of generating a selection model to be used in providing personalized non-competitive advertising 610 includes the steps of: (1) collecting product data 612; (2) collecting data regarding user behavior 614; (3) and generating a selection model 616.

The steps of collecting product data 612 and collecting data regarding user behavior 614 may be performed as an offline process, whereby data is collected prior to building a model, as an online process, whereby data is collected and processed as part of building the model, or as any combination of online and offline processes. In the example provided herein, the steps of collecting product data 612 and collecting data regarding user behavior 614 are offline processes. Although any information useful in selecting targeted content may be collected in the steps of collecting product data 612 and collecting data regarding user behavior 614, the processes shown in FIG. 6 includes collecting both product information and transactional information. Product information may include data regarding the attributes of products or services. For example, product information may include: genre (e.g., movie tickets, dvd, cd, mp3, ring-tone, etc.); product identification; title; categories; author; artists (e.g., actors, directors, performers, etc.); brand; popularity; picture; price; location; date/time (e.g., for movie tickets, concerts, sporting events, etc.), etc. Transactional information may include data regarding attributes of actions users have taken with respect to the products and services, for example: purchases (including data regarding user identification, product identification, price, date/time, etc.); product views (including data regarding user identification, product identification, price, date/time, etc.); searches (including data regarding user identification, search keywords, date/time, etc.); user lists, e.g., wish lists, wedding registries, etc. (including data regarding user identification, product identification, price, date/time, list type, etc.). The transactional data may form the entirety of the information collected in the step of collecting data regarding user behavior 614. However, the step of collecting data regarding user behavior 614 may further include the collection of information as described below with respect to FIG. 7.

The product information and transactional information may be raw data collected from a plurality of retail websites or may be any other type of data, electronic or otherwise, collected from one or more retailers. Any of the data may be continuously collected and updated or may be collected and updated in batch format. Updating the data in batch format, for example, approximately once an hour, may approximate real time updates for practical purposes. The data may be collected and updated in real time when collecting, for example, raw data. However, data that requires processing may be collected at intervals.

The product information and transactional information may be analyzed and used in the step of generating a selection model 616. The selection model described herein use "similarity" and "popularity" as the controlling dimensions of the model. However, it is understood that the context of the targeted content will determine the dimensions most appropriate for controlling the selection model. Further, the models may contain information about the performance of the data in the models and inter-relations. For example, although U2 is similar to Dave Matthews Band, U2 ads aren't performing well. Or perhaps U2 ads aren't performing well when the advertisement is targeted to a particular segment of customers. Using the sample information described above with respect to the product information and transactional information the following is a non-exhaustive list of potential databases that may be formed to comprise the selection model: products from a first retailer that are similar to products from a second retailer; artists that are the same or similar to each other; authors that are similar to each other; categories that are similar to each other; popular items in a particular category; products purchased as a result of a search; products related to an artist, genre, product brand, etc.; etc. These databases may be created using information collected from a single retailer or information collected across a plurality of retailers. In one example, it is envisioned that there will be numerous databases including at least one database for each retailer from which information is collected.

The databases created using the product information and transactional information are referred to as "lookup databases" because they are not used to perform analysis or complex selection. They are databases keyed off of one or more fields, such as, for example, product identification, artist name, etc. Database lookups are simple processes that do not require the computing power or time of more complex actions, such as, for example, database joins or other relational compositions. It is contemplated that the databases do not need to be symmetrical. It is further understood that the values associated with the lookups may be an individual value, a set of values, an ordered list of values, etc. Further, the lookup values can be structured items, such as, for example, lists, numbers, pairs, etc. Accordingly, the process is capable of incorporating very flexible data structures. It is understood that any complex computation (such as a join or the computation of conditional probability) could be executed during the process of creating the lookup database, so as to incur the large computational power and time required for such computations prior to the "real-time" process of selecting an advertisement.

As shown in FIGS. 4 and 5, the second step in the processes includes generating a user model 414 and 514. A user model is a model used to analyze users 26 to which targeted content will be directed. The user model may be structured as the graphs described above with respect to FIGS. 1-3. Alternatively, the user model may be any other model used to describe users 26 for purposes of providing targeted content. For example, a process for generating a user model is described below with respect to FIG. 7.

Figure 7:
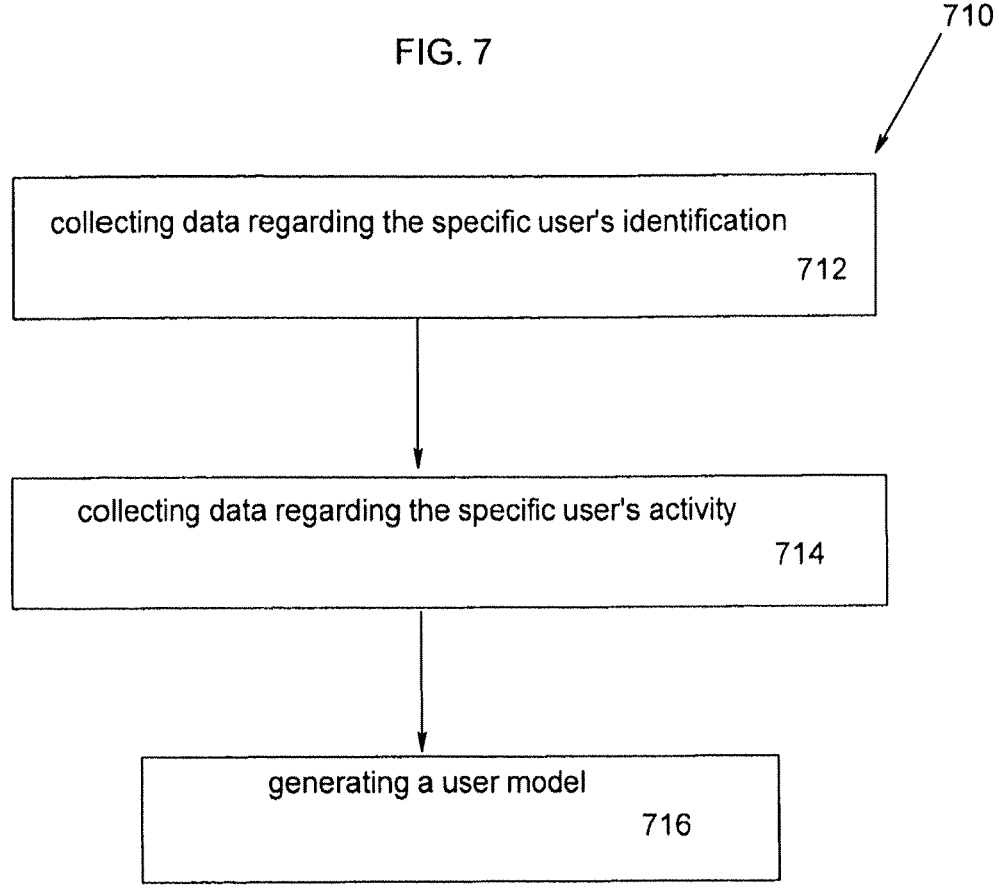
FIG. 7 is a flow chart depicting a process for generating a user model to be used in providing personalized non-competitive advertising to a specific user.

FIG. 7 illustrates a process for generating a user model to be used in providing personalized non-competitive advertising to a specific user 710. As shown in FIG. 7, the process for generating a user model to be used in providing personalized non-competitive advertising to a specific user 710 includes the steps of: (1) collecting data regarding the specific user's identification 712; (2) collecting data regarding the specific user's activity 714; and (3) generating a user model 716.

Similar to what is described above with respect to FIG. 6, the steps of collecting data regarding the specific user's identification 712 and collecting data regarding the specific user's activity 714 may be performed as an offline process. However, it is further contemplated that these steps may further benefit from additional online processing. For example, user data such as user identification, search history and purchase history may be collected as part of an offline process. However, the offline data may be supplemented by additional online data such as, for example: most recent products read/viewed/purchased/used/listened to; most recent searches; search terms referring the user 26 to the retailer; information regarding product lists (i.e. wish lists, etc.); location approximated by the user's IP address; price ranges of purchases made by the user; etc.

As noted above with respect to the product information and transactional information, the user data and the user activity data may be raw data collected from a plurality of retail websites or may be any other type of data, electronic or otherwise, collected from one or more retailers. Any of the data may be continuously collected and updated or may be collected and updated in batch format. Updating the data in batch format, for example, approximately once an hour, may approximate real time updates for practical purposes. The data may be collected and updated in real time when collecting, for example, raw data. However, data that requires processing may be collected at intervals.

The user data and the user activity data may be analyzed and used in the step of generating a user model 716. The user model databases may be created using information collected from a single retailer or information collected across a plurality of retailers. Again, the databases are keyed off of one or more fields and it is contemplated that the databases do not need to be symmetrical. It is further understood that the values associated with the lookups may be an individual value, a set of values, an ordered list of values, etc. Further, the lookup values can be structured items, such as, for example, lists, numbers, pairs, etc. Accordingly, the process is capable of incorporating very flexible data structures. Further, it is also understood that complex computation may be executed prior to the "real time" need to select an advertisement.

As shown in FIGS. 4 and 5, the third step in the processes includes utilizing a rule set for identifying non-competitive advertisements. A rule set for identifying non-competitive advertisements may be a rule set that leverages business rules in an attempt to avoid upsetting competitors that are cooperating within the targeted advertising context. For example, the rule set may include databases and rules identifying: non-competitive genres or goods and services; similar genres of goods and services; competitive retailers and websites; non-competitive retailers and websites; etc. The business rules may be manually created by an operator of the process, may be provided by retailers or other participants or may be established in any other manner and may include any rules and other information that is helpful in identifying non-competitive advertising. Similar to the selection models 412 and 512 and user models 414 and 514 described above, the rule set for identifying non-competitive advertisements may be upgraded in real time, in batch format to approximate real time, manually, or at any other interval.

As further shown in FIGS. 4 and 5 the third step in the processes includes selecting personalized non-competitive electronic advertising from the plurality of advertisements using the selection model and user model to identify relevant advertisements and using the rule set for identifying non-competitive advertisements. An illustrative example will be used to describe this portion of the process; however, it is understood that the example is merely one example of the many processes that may be employed to provide the solutions of the present subject matter. It is also contemplated that the advertisements may be compiled in one or more databases or, alternatively, in some cases the advertisements may be created as part of the selection process, wherein a personalized advertisement is created, for example, using information from the selection model and user model as well as any optional additional advertisement information.

For example, in one implementation, the present solutions embodied in the third step shown in FIGS. 4 and 5 relates to analyzing a user's purchase of a CD from an originating site to find relevant products from non-competitive genres or categories. The originating site is designated as an originating site because it is the location from which the user activity is being collected and to which any selected advertisements may be provided. In this example, if the user 26 were to buy a U2 CD from the originating site, the rule set for identifying non-competitive advertisements may be implemented to reduce the number of databases to be utilized in the application of the selection models and user models. For example, if the originating site is an online music retailer, the application of the rule set for identifying non-competitive advertisements may provide that non-competitive advertisements may be selected from destination sites including a ring tone site, a concert ticket site and a home improvement site. As noted above, the rule set can be compiled from business rules created with input from the system operator as well as the retailers themselves.

Subsequent application of the selection models and user models may determine, that based on the results of a "similar artists" database, that Pearl Jam and Dave Matthews Band are "similar" to U2 and may further be used to determine whether there are products or services related to Pearl Jam and/or Dave Mathews Band to be advertised from the identified non-competitive sites. As a result, it may be determined that the ring tone site has ring tones from U2, Pearl Jam and Dave Matthews Band. The advertisements for these ring tones may then be scored based on the database in which they are found and the particular method used to find them. Further, the ring tone site itself may then be scored taking into account the individual scores of the products and services offered therein. Further, the application of the selection models and user models may determine from the concert tickets site that there is a U2 concert in the next few weeks, but it is far from the user's 26 location. There may also be Pearl Jam and Dave Matthews Band concerts scheduled within 20 miles of the user 26. Accordingly, a score maybe associated with each of the products and the overall site. The evaluation of the home improvement site may determine that there are no products related to U2 or any similar artists. Accordingly, the home improvement site's score may be zero. Note also that the number of advertisements being considered may be great. From the plurality of scored sites and product/services advertisements, one or more preexisting or dynamically created advertisements associated with the selected products and services may be selected to be provided to the user 26.

The scoring of the products/service and retailers may be based on product data and transactional data, may be a feedback model relying on retailers bidding for placement or may be any other scoring model, including models combining product data, transaction data and feedback. In some specific examples, the variables used for scoring may include the search terms of the user, the past purchase, browse, or click behavior of the user, brands the user has shown interest in, the price ranges of the user's purchases, etc. In a further example, the scoring mechanism could be an implementation resembling a Naïve Bayes prediction.

As shown in FIG. 5, the fourth step in the process may be providing one or more identified relevant and non-competitive advertisements in an electronic format 518. For example, once an advertisement has been selected, or created, as described above, the advertisement may be provided to the user 26 in electronic format. For example, the advertisement may be a personalized advertisement rendered in HTML, Flash, binary or other format. Alternatively, the advertisement may be returned via a web service call using XML. Further, any method of delivering an electronic or personalized electronic advertisement may be used. Any electronic format may be used to provide the advertisement. For example, selected advertisements may be provided to computers, cell phones, smart phones, PDAs, or any other electronic device, portable or not. The advertisement may be audio, video, a combination of audio and video, or any other manner of communicating the advertisement to the user 26.

The disclosed embodiments address problems related to providing targeted content in cooperative advertising. The disclosed embodiments solve these problems, at least in part, by providing cooperative electronic advertising comprising the steps of: generating a plurality of user models, wherein each user model is associated with an originating retailer; receiving a request to advertise one or more products related to a set of products which are sold by one or more of the retailers; identifying a subset of the plurality of user models by applying an advertisement-specific selection model to the plurality of user models to identify users for which the specific electronic advertising is relevant; and communicating the specific electronic advertising to the identified plurality of users for which the specific electronic advertising is relevant such that each user receives a communication that appears to have been sent by the originating retailer associated with each user model.

In yet another example, the above needs are met by providing self-service cooperative electronic advertising comprising the steps of: generating a plurality of user models, wherein each user model is associated with an originating retailer; receiving from a user, who may or may not be associated with any originating retailers, an electronic advertisement related to a one or more products which are sold by one or more of the originating retailers; receiving from a user parameters of an advertisement-specific selection model; identifying a subset of the plurality of user models using the specific advertisement selection model; and communicating the electronic advertising to the identified plurality of users for which the specific electronic advertising is relevant such that each user receives a communication that appears to have been sent by the originating retailer associated with each user model.

FIG. 8 illustrates a process for identifying a subset of users for which a non-competitive advertisement is relevant 810. As shown in FIG. 8, the process for identifying a subset of users for which a non-competitive advertisement is relevant 810 includes the steps of (1) generating a plurality of user models 812; (2) identifying a subset of the plurality of user models by applying an advertisement-specific selection model 814; and (3) applying a non-competitive rule set to the identified subset of user models 816.

The step of generating a plurality of user models 812 may be accomplished in the same manner as the process described above with respect to FIG. 7. Accordingly, in a preferred embodiment, the plurality of user models will each include or incorporate information regarding the users' identity and the users' activity. In addition, the user models may include information regarding a particular retailer with which the user has a preexisting relationship. Accordingly, this information can be used to ensure any targeted advertisements come from a retailer with which the user has a relationship, thereby increasing the likelihood that the advertisement will be effective.

After generating a plurality of user models 812, the step in the process is generating a subset of the plurality of user models by applying an advertisement-specific selection model 814. An advertisement-specific selection model is a model that includes information regarding the types of users to which a particular advertisement is to be directed. It is analogous in form and function to the various selection models described herein, with the distinction that the advertisement-specific selection model is based on information regarding the data/demographics of user models to be selected. For example, based on data collected as part of this and other systems and processes, it may be known that a particular product is highly marketable within a given age range, gender, geographic location, income level, race, purchasing history, etc. This identified demographic information would be included as the data set within the advertisement-specific selection model and would be used to search and identify the desired user models to be selected and utilized in the process for identifying a subset of users for which a non-competitive advertisement is relevant 810.

The next step identified in FIG. 8 is the step of applying a non-competitive rule set to the identified subset of user models 816. As described above, with respect to FIGS. 4 and 5, the non-competitive rule set is a set of business rules used to avoid upsetting competitors and promote cooperation between retailers within the cooperative advertising context.

Through the process for identifying a subset of users for which a non-competitive advertisement is relevant 810 shown in FIG. 8, retailers may join together to provide cooperative advertising to promote a product or service to a consumer. The advertisement may be presented by a retailer having a preexisting relationship with the customer and the advertisement may be sent at the request of a third party, for example, the brand or manufacturer of the product or service. The group of retailers benefit by making use of economies of scale to send targeted advertisements to selected consumers, such that each consumer receives an advertisement provided by a retailer through which the consumer has a preexisting relationship. For example, to secure a relationship with, and advertising dollars from, a large brand, a group of retailers may cooperate and make their customer data available for the creation of the user models used in the process for identifying a subset of users for which a non-competitive advertisement is relevant 810. The originator of such an advertisement benefits by marketing specific products or services to the customer base of the one or more retailers; thereby increasing the exposure and potential sales of such products and services. The one or more retailers benefit from the revenue generated from the advertising. Further illustrative examples are provided below.

Figure 10:
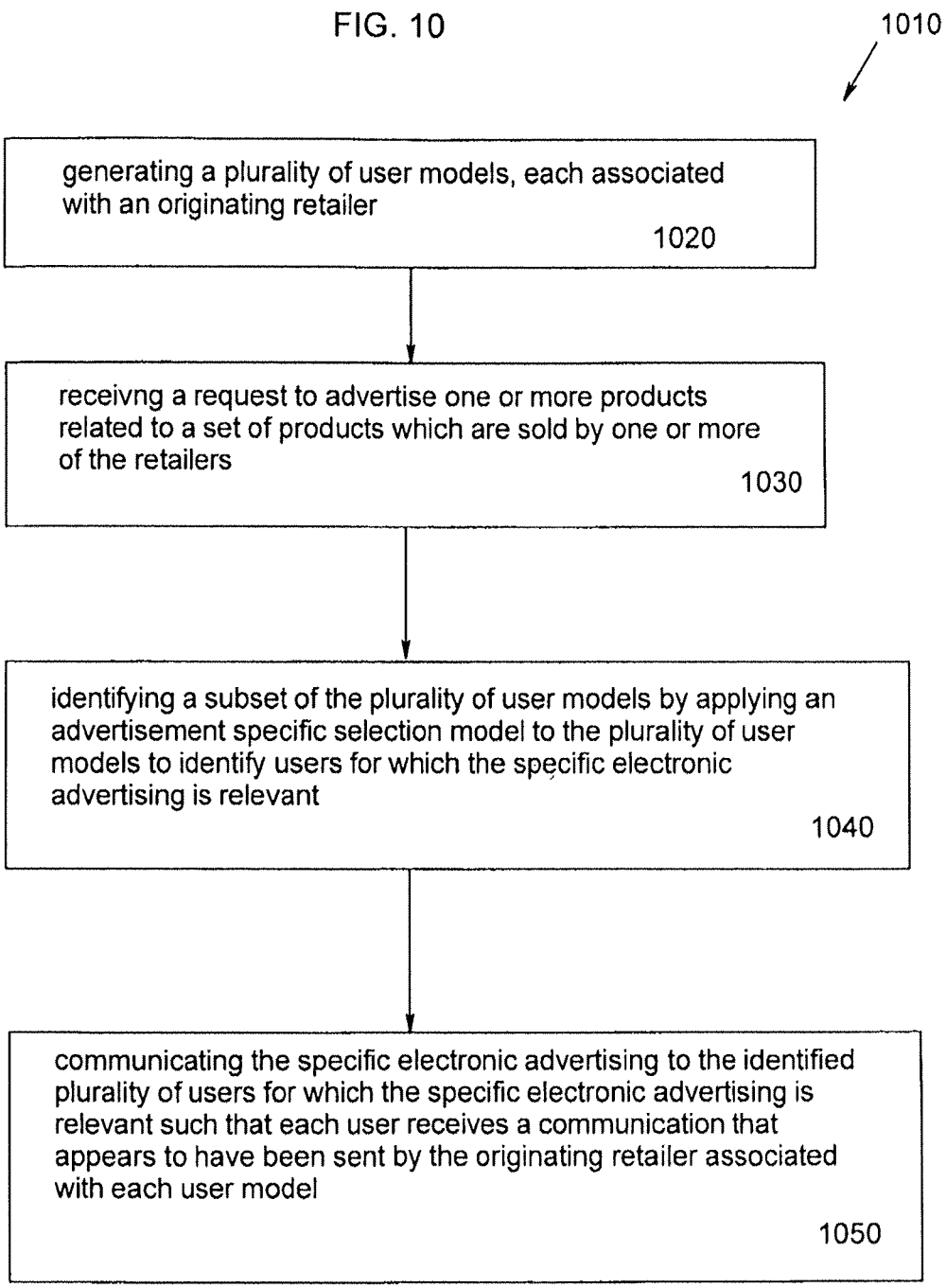
FIG. 10 is a flow chart depicting a process for identifying a subset of users for which a cooperative electronic advertising is relevant.

For example, FIG. 9 illustrates a process for providing cooperative electronic advertising and FIG. 10 illustrates a process for providing self-service cooperative electronic advertising. The processes described with reference to FIGS. 9 and 10 may be implemented, in one example, using a system for providing targeted content 10 in which an arrangement 12 includes a controller 14 that controls one or more data repositories 16, a receiver module 18 and a transmitter module 20, such as the system 10 described with respect to FIG. 1. However, it is contemplated that other systems 10 may be employed for implementing the processes described herein with respect to FIGS. 9 and 10.

As shown in FIG. 9, the process for providing cooperative electronic advertising 910 includes the steps of: (1) generating a plurality of user models, each associated with an originating retailer 920; (2) optionally generating a plurality of selection models (similarities, etc.) 930 (3) receiving a request to advertise one or more products or services 940; (4) identifying a subset of relevant user models by applying an advertisement targeting model 950; and (5) communicating the electronic advertising to the users such that each advertisement appears to have been sent by the respective originating retailer 960.

Through the optional step of generating a plurality of selection models (similarities, etc.) 930, selection models such as those described above with reference to FIG. 6 can be generated for utilization in the process for providing cooperative process for providing cooperative electronic advertising 910. The selection models may be used in conjunction with the user models to target desirable users for receipt of the advertisement.

The step of receiving a request to advertise one or more products 940, as shown in FIG. 9, typically includes a third party retailer requesting a cooperative advertisement to be provided to users by the originating retailers. However, the request may be initiated by originating retailers, users, prompted by an automated system, or in any other manner in which an advertisement request may be initiated.

FIG. 9 further illustrates the step of identifying a subset of relevant user models by applying an advertisement targeting model 950. The advertising targeting model may be analogous to the selection models described above, especially with reference to FIG. 6. Whereas the selection models described above enable targeted advertising content to be selected for providing to a given user, the advertising targeting models enable users to be selected to receive a given advertisement. Accordingly, whereas the selection models are formed from the synthesis of product data and user behavior, the advertising targeting models are created by synthesizing user data and user behavior. Thus, the advertising targeting models may be designed primarily to predict which types of users will be most responsive to the advertising.

The last step shown in FIG. 9 is the step of communicating the electronic advertising to the users such that each advertisement appears to have been sent by the respective originating retailer 960. In this step, the targeted advertisement is provided to the user such that the advertisement is associated with the originating retailer. For example, the advertisement may be provided in an e-mail to the user from the originating retailer. Alternatively, the advertisement may be provided to the user the next time the user accesses the originating retailer's website. It is further understood that the advertisement may be provided to the user through any known electronic means such that the user identifies the source of the advertisement as the originating retailer or that the originating retailer has approved of or endorsed the advertisement The process for identifying a subset of users for which a cooperative electronic advertising is relevant 1010 is shown in FIG. 10. As shown in FIG. 10, the process for identifying a subset of users for which a cooperative electronic advertising is relevant 1010 includes the steps of: (1) generating a plurality of user models, each associated with an originating retailer 1020; (2) receiving a request to advertise one or more products related to a set of products which are sold by one or more of the retailers 1030; (3) identifying a subset of the plurality of user models by applying an advertisement specific selection model to the plurality of user models to identify users for which the specific electronic advertising is relevant 1040; and (4) communicating the specific electronic advertising to the identified plurality of users for which the specific electronic advertising is relevant such that each user receives a communication that appears to have been sent by the originating retailer associated with each user model 1050.

The process for identifying a subset of users for which a cooperative electronic advertising is relevant 1010 shown in FIG. 10 is similar to the process for providing cooperative electronic advertising 910 shown in FIG. 9. Some of the distinguishing concepts between the processes shown in FIGS. 9 and 10 are that in FIG. 10 the process includes generating a plurality of user models for use with a given request to advertise, wherein the process in FIG. 9 includes receiving a plurality of requests for use with a given user model. In the process shown in FIG. 9, a subset of products is identified, in the process shown in FIG. 10, a subset of user models is identified.

Other solutions are directed towards systems and methods wherein recommendation systems may be adapted to meet evolving business needs. In an example, the above needs are met by providing a method of incorporating product recommendation boosting in an automated recommendation system comprising the steps of: receiving recommendation boost instructions; receiving a request for one or more recommendations; receiving a set of recommendations from one or more automated recommendation systems, wherein each recommendation system utilizes one or more selection models or user models; and modifying the set of product recommendations according to the recommendation boost instructions.

In another example, the above needs are met by providing a computer-readable medium having computer-executable instructions for incorporating product recommendation boosting in an automated recommendation system, the computer-executable instructions causing the system to perform the steps of: receiving recommendation boost instructions; receiving a request for one or more recommendations; receiving a set of recommendations from one or more automated recommendation systems, wherein each recommendation system utilizes one or more selection models or user models; and modifying the set of product recommendations according to the recommendation boost instructions.

In a further example, the above needs are met by providing an arrangement for incorporating product recommendation boosting in an automated recommendation system comprising: a controller that receives recommendation boost instructions; receives a request for one or more recommendations; receives a set of recommendations from one or more automated recommendation systems, wherein each recommendation system utilizes one or more selection models or user models; and modifies the set of product recommendations according to the recommendation boost instructions.

Figure 11:
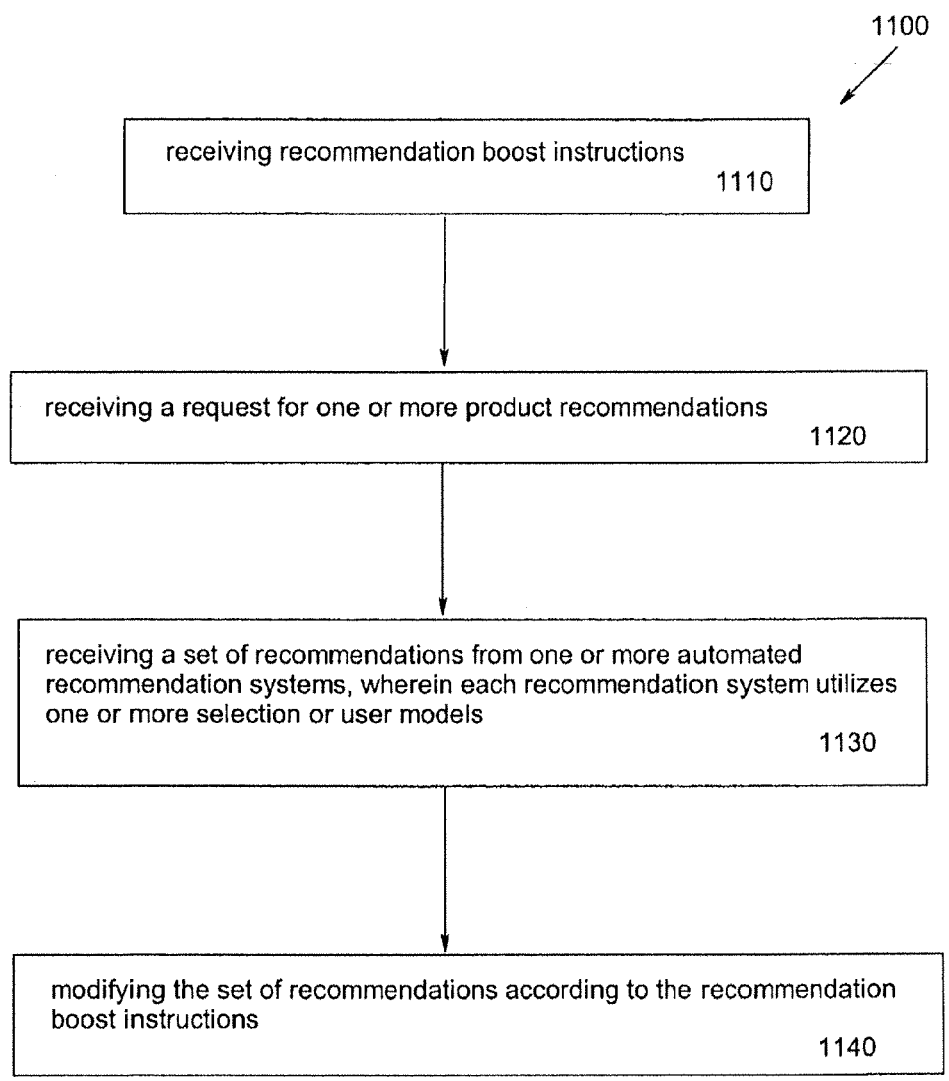

A method of incorporating recommendation boosting in an automated recommendation system 1100 is shown in FIG. 11. As shown in FIG. 11, the method of incorporating recommendation boosting in an automated recommendation system 1100 includes the steps of: receiving recommendation boost instructions 1110; receiving a request for one or more product recommendations 1120; receiving a set of recommendations from one or more automated recommendation systems, wherein each recommendation system utilizes one or more selection or user models 1130; and modifying the set of recommendations according to the recommendation boost instructions 1140.

The method of incorporating recommendation boosting in an automated recommendation system 1100 shown in FIG. 11 can be applied to systems in which products are being recommended to be advertised to given users, users are being recommended for advertisements for given products, or any other recommendation systems as described herein.

For example, t is understood that an automated recommendation system may be any system which generates recommendations: (1) of products or services to advertise to one or more customers; or (2) customers to which to advertise one or more products or services. Many examples of automated recommendation systems are described above with reference to FIGS. 1-10. As described, selection models may be particularly useful within an automated recommendation system designed to generate recommendations of products or services to advertise to one or more customers and user models may be particularly useful within an automated recommendation system designed to generate recommendations of customers to which to advertise one or more products or services. However, it is also understood that selection models and user models may be used conjunctively within a given automated recommendation system.

In the example of the method of incorporating product recommendation boosting in an automated recommendation system 1100 shown in FIG. 11, the automated product recommendation system is used to generate "natural" recommendations (i.e., those prior to the consideration of boosts) which are then enhanced or augmented by recommendation boost instructions via the step of modifying the set of product recommendations according to the recommendation boost instructions 1140. The recommendation boost instructions may be negative or positive boost instructions as described further below.

In a simple example, if the set of products A, B, C, D & E was received as the set of product recommendations in step 1130 and products D & E were the subject of the boost instructions received in step 1110, the boost instructions stating that products D & E should be given priority in any recommended set in which they appear, the resulting recommendation set may be modified to be displayed to the customer as: D, E, A, B & C, in that order. In another example, with the same boosts requests for D & E, if ensemble learning is being used (as described further herein), and there are two potential recommendation sets being proposed, (A, B, C) and (D, E, A) then the second set, (D, E, A) may be preferred because it contains two items with boost requests.

In another example, recommendation boost requests may be applied if a particular item is a new product that is not being sufficiently recommended. If, for example, the merchandiser responsible for this product had bet his career on it being successful, but because other products are doing well in recommendations, the product is not getting its chance at the spotlight, the merchandiser may boost its visibility in recommendations and the merchandiser then sees it marketed throughout the site. After a while, the boost may no longer be necessary as the product builds up its own inertia, but it needed a little bit of loving care to get it over the hump. It is also understood that boosts may be applied to product, service and user categories, rather than to individual products, services and users. For example, a boost may be applied to a particular shoe model, brand of shoe, shoe category (e.g., casual, dress, men's, women's), type of shoe (e.g., basketball, running, wingtip) or to the entire product class (i.e., shoes may be recommended more often than other articles of clothing). For example, if there is a boost for brand X, and products A & C are associated with brand X, a product recommendation set including A, B, C and D may not have to be modified because brand X is represented by two of the four recommendations, including the first recommendation; whereas, if there were individual boost requests for products A & C (instead of with brand X which is then associated with A & C), the product recommendation set including A, B, C and D may be (possibly unnecessarily) modified to be presented, in order, as A, C, B and D.

Furthermore, in another example, incorporating boosts into an automated product recommendation system may include binding the boost request with a particular context. In these cases, the boost request is applied selectively to the recommendation sets only when the properties of the binding are met. For the purposes of illustration, in one example, if boost instructions are submitted for boosting a category of products, say "Pants", those boost instructions may also be bound to the category "Shirts", such that the recommendation system will recommend products from the category "Pants" more frequently, but only when the request for recommendations is related to "Shirts". So, to extend on this example, if a consumer were shopping on this site and viewed a shirt, and the recommendation system was considering the set of recommendations (A, B, C, P1, P2) where only the first three items would be displayed and the final two (P1 and P2 respectively) would not be displayed, the system would "boost" P1 & P2 since their "bind" condition is met, resulting in the recommendation set (P1, P2, A). If the user were then to proceed to a page for shoes, and specifically not shirts, and the recommendation system were considering the set of recommendations (D, E, F, P1, P2); without additional "boost" rules, the recommendation system would not apply the boost to P1 and P2 because the "bind" condition is not met.

As described, recommendation boost requests, or "boosts," may be used to alter or modify the recommendations output from an automated recommendation system. The boosts may be relative, absolute, positive (supportive), negative (suppressive), contextually dependent, contextually independent, product specific, category specific, etc. What distinguishes boosts from the underlying variables of selection and user models is that the boosts can be applied to alter a recommendation set after an automated product recommendation system has completed its recommendations. In other words, because recommendation systems are complex to change, and business goals change frequently, boosts are needed to quickly and efficiently adapt an automated product recommendation system to meet current business objectives. Therefore, the use of boosts as a user-input—a simple user interface that can be utilized to modify the behavior of the system on the fly—is powerful as it doesn't require re-creating the system. Furthermore, since different businesses have different needs (i.e., a retail clothing store may have one strategic initiative—to remove old inventory, while a retail seed store may have a different initiative—to increase sales of next-season's plants), it is impossible, or at least incredibly complex, to systematize all of these different needs in a single automated product recommendation system. However, the use of boosts allow a given automated product recommendation system to be adaptable to a broad span of business objectives. Therefore, the incorporation of boosts in an automated product recommendation system enabling the service to service the needs of a diverse set of businesses in a scalable fashion (i.e., business rules—boosts and bindings) is a very clear benefit and is distinct from including these variables as inputs to the system.

Other solutions are directed towards systems and methods for providing a user an interface for incorporating boosting into a recommendation system. In an example, the above needs are met by providing a method of incorporating product recommendation boosting in an automated recommendation system comprising the steps of: presenting a user with a visual electronic interface adapted to receive recommendation boost instructions regarding a boost subject; receiving recommendation boost instructions via the visual electronic interface, wherein the recommendation boost instructions indicate how strongly the boost subject should be recommended or suppressed from being recommended; receiving a set of recommendations from one or more automated product recommendation systems, wherein each recommendation system utilizes one or more selection models or user models; and modifying the set of recommendations according to the recommendation boost instructions.

In another example, the above needs are met by providing a computer-readable medium having computer-executable instructions for incorporating product recommendation boosting in an automated recommendation system, the computer-executable instructions causing the system to perform the steps of: presenting a user with a visual electronic interface adapted to receive recommendation boost instructions regarding a boost subject; receiving recommendation boost instructions via the visual electronic interface, wherein the recommendation boost instructions indicate how strongly the boost subject should be recommended or suppressed from being recommended; receiving a set of recommendations from one or more automated product recommendation systems, wherein each recommendation system utilizes one or more selection models or user models; and modifying the set of recommendations according to the recommendation boost instructions.

In a further example, the above needs are met by providing an arrangement for incorporating product recommendation boosting in an automated recommendation system comprising: a visual electronic interface adapted to receive recommendation boost instructions regarding a boost subject; and a controller that receives recommendation boost instructions from the visual electronic interface, wherein the recommendation boost instructions indicate how strongly the boost subject should be recommended or suppressed from being recommended; receives a set of recommendations from one or more automated product recommendation systems, wherein each recommendation system utilizes one or more selection models or user models; and modifies the set of recommendations according to the recommendation boost instructions.

Figure 12:
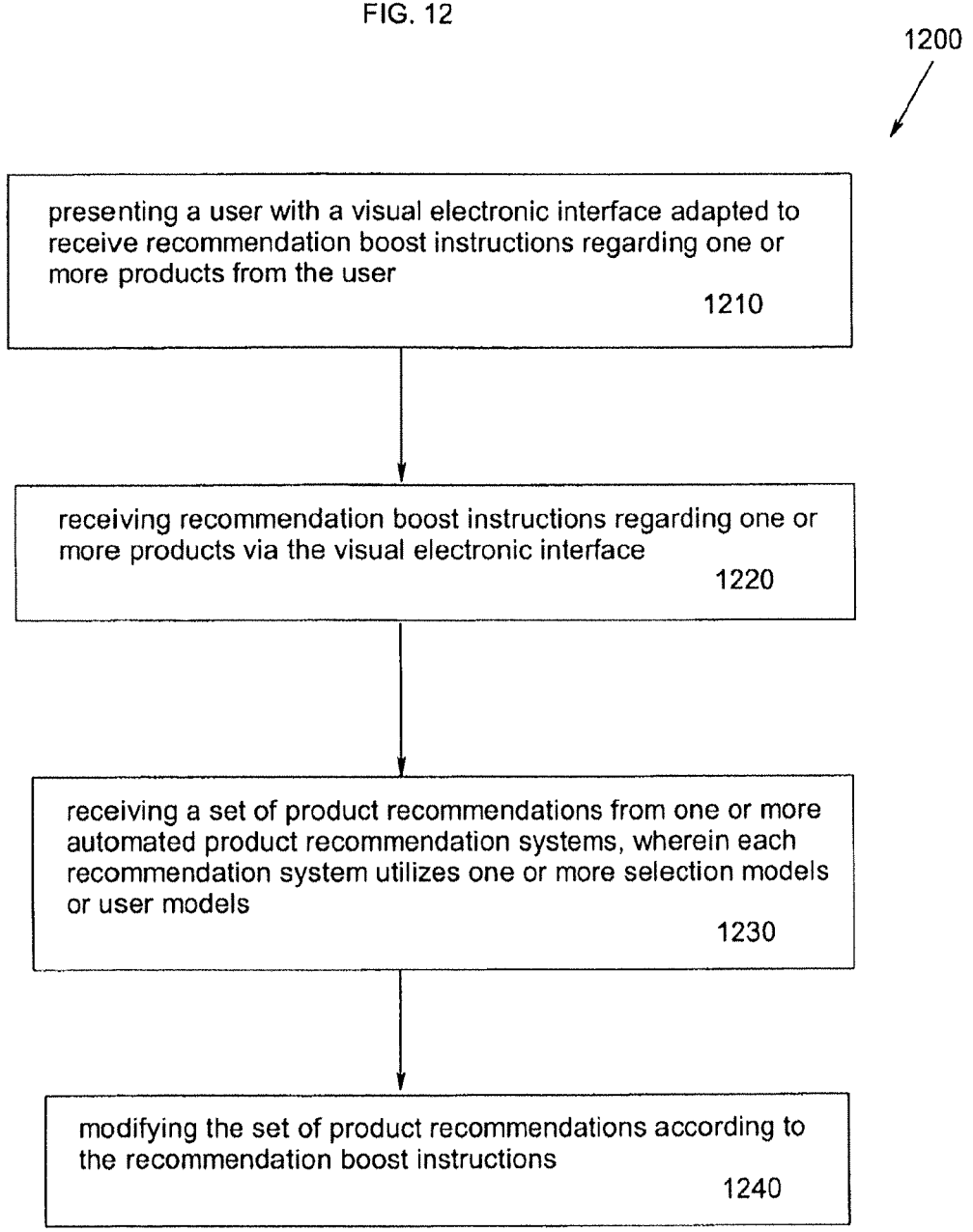
FIG. 12 is a flow chart depicting a process for incorporating product recommendation boosting in an automated recommendation system.

A method of incorporating product recommendation boosting in an automated recommendation system 1200 is shown in FIG. 12. As shown in FIG. 12, the method of incorporating product recommendation boosting in an automated recommendation system 1200 includes the steps of: presenting a user with a visual electronic interface adapted to receive recommendation boost instructions regarding one or more products from the user 1210; receiving recommendation boost instructions regarding one or more products via the visual electronic interface 1220; receiving a set of product recommendations from one or more automated product recommendation systems, wherein each recommendation system utilizes one or more selection models or user models 1230 and modifying the set of product recommendations according to the recommendation boost instructions 1240. As described above, the boost instructions may be relative, absolute, positive (supportive), negative (suppressive), contextually dependent, contextually independent, product specific, category specific, etc.

Boosts may be input to a system by a user in many different manners. In just one example, the method of input may be a visual electronic interface. For example, the visual electronic interface may be a visual electronic interface such as the ones shown in FIGS. 13-15. In the examples shown in FIGS. 13-15, the visual electronic interface may be a graphical representation of a boost control 1300, such as, for example, a dial or a slider displayed on a visual display that is part of a computer. The visual electronic interface enables a user to control the quality and strength of the boost intuitively and may further provide the user interactive visual, auditory or other feedback.

Figure 13:
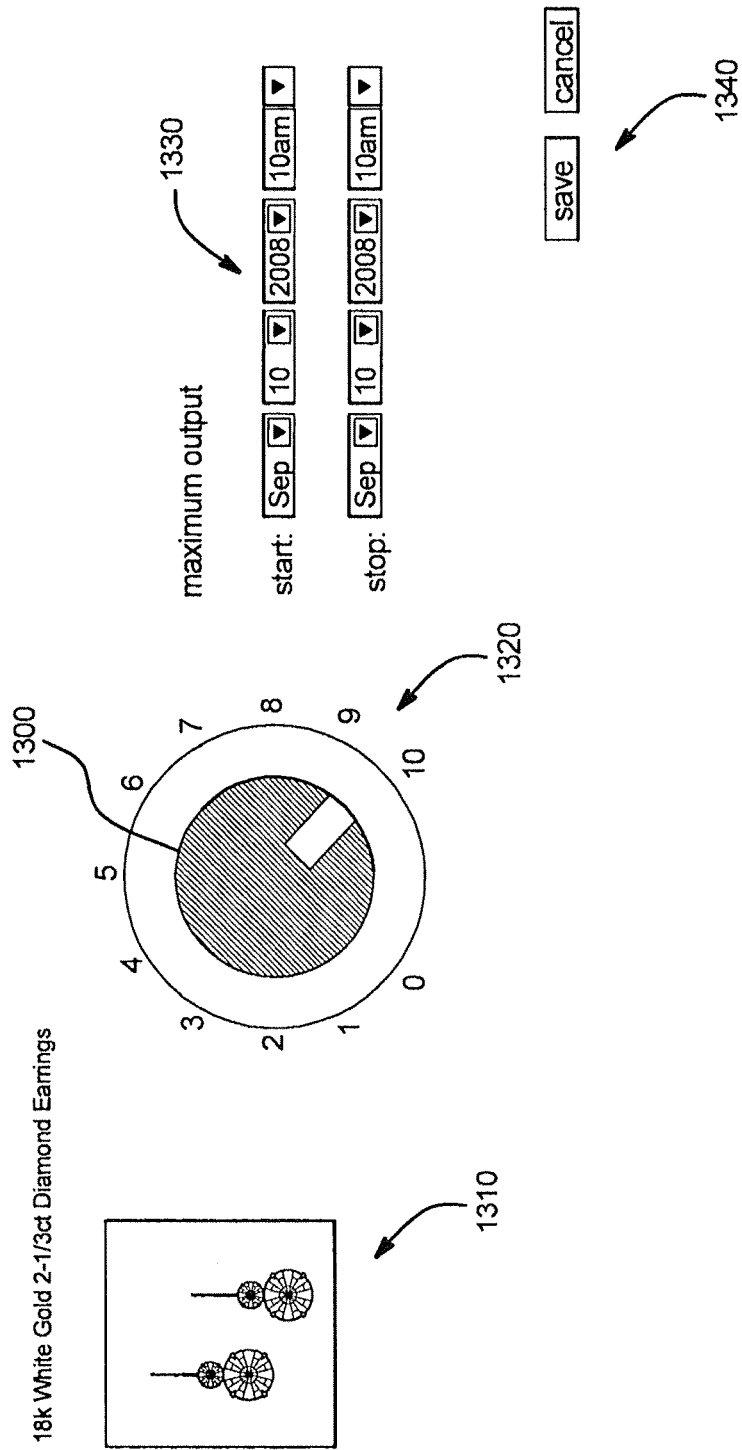
FIG. 13 is an example of a user interface for use in the process shown in FIG. 12.
Figure 14:
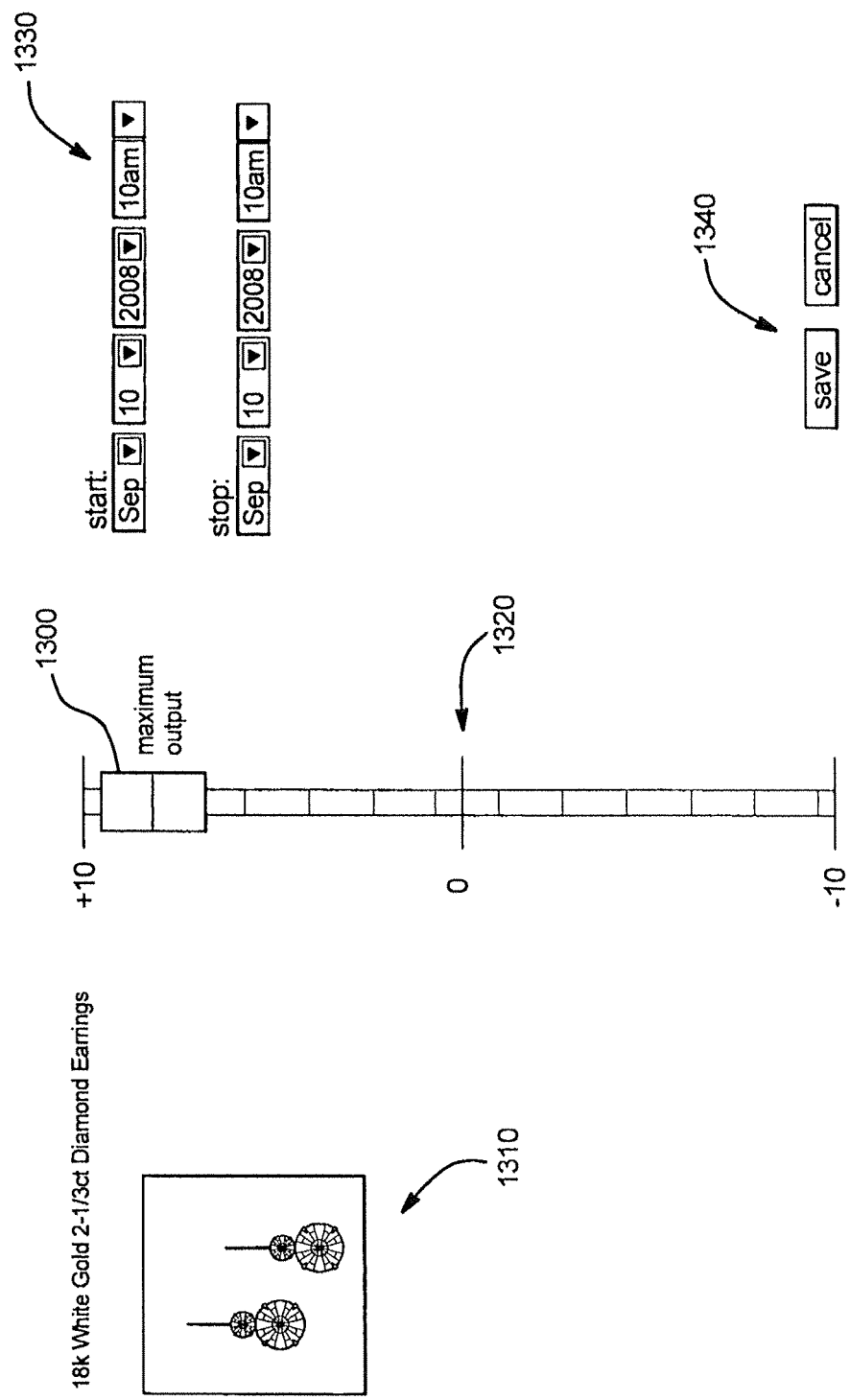
FIG. 14 is another example of a user interface for use in the process shown in FIG. 12.
Figure 15:
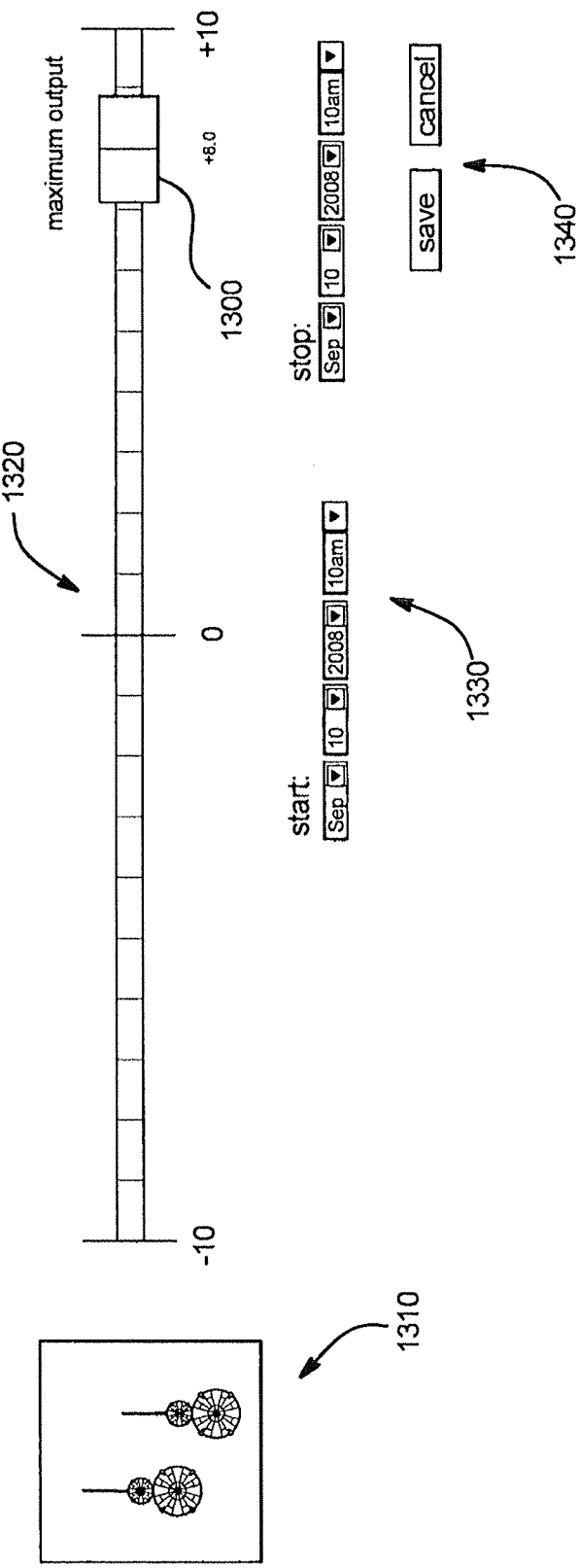
FIG. 15 is another example of a user interface for use in the process shown in FIG. 12.

As shown in FIGS. 13-15, the visual electronic interface may include product identification 1310, boost intensity controls 1320, start and stop dates and times 1330 and controls for saving or cancelling the boost instructions 1340. It is contemplated that additional controls may be provided within the visual electronic interface, such as, for example, controls for inputting binding instructions. It is also understood that rather than the product identification shown in FIGS. 13-15 the identifier may otherwise display a brand, category or other identifier of the group, category or attribute to which the boost is to be applied.

As shown in FIGS. 13-15, a numerical value may be used to represent the relative strength of a boost request. In the examples shown, the numerical value ranges from −1.0 to 1.0, and a higher numerical value indicates the strength with which the rule is interpreted. A 0.0 value boost would be allowed, but would not impact the recommendations at all. For example, if the natural recommendations of a system would be (A, B, C, D, E) and there is a boost request for (B, 0.1) and for (C, 1.0), the resulting recommendations may be (C, B, A, D, E) because the relative strength of the boost for C is so much higher than that of the boost request for B.

Other solutions are directed towards systems and methods for using ensemble learning to improve the selection of recommendations from recommendation systems. In an example, the above needs are met by providing a method of improving product recommendations for a first user comprising the steps of: receiving a request for one or more product recommendations for a first user, each product recommendation being associated with any one of a plurality of retailers; receiving a plurality of recommendation sets from one or more automated product recommendation systems, wherein the plurality of recommendation sets are generated using different selection models; and using ensemble learning to select one or more most relevant product recommendation sets from the plurality of product recommendation sets.

In another example, the above needs are met by providing a computer-readable medium having computer-executable instructions for improving product recommendations for a first user, the computer-executable instructions causing the system to perform the steps of: receiving a request for one or more product recommendations for a first user, each product recommendation being associated with any one of a plurality of retailers; receiving a plurality of recommendation sets from one or more automated product recommendation systems, wherein the plurality of recommendation sets are generated using different selection models; and using ensemble learning to select one or more most relevant product recommendation sets from the plurality of product recommendation sets.

In a further example, the above needs are met by providing an arrangement for improving product recommendations for a first user comprising: a controller that receives a request for one or more product recommendations for a first user, each product recommendation being associated with any one of a plurality of retailers; receives a plurality of recommendation sets from one or more automated product recommendation systems, wherein the plurality of recommendation sets are generated using different selection models, and uses ensemble learning to select one or more most relevant product recommendation sets from the plurality of product recommendation sets.

In yet another example, the above needs are met by providing a method of improving user set recommendations for product advertising comprising the steps of: receiving a request for user set recommendations from any of a set of retailers where such request is related to one or more products; receiving from a plurality of user sets from one or more automated user recommendation systems, wherein the plurality of user sets are generated using different user models; and using ensemble learning to select one or more most relevant user sets from the plurality of user sets.

In still another example, the above needs are met by providing a computer-readable medium having computer-executable instructions for improving user set recommendations for product advertising, the computer-executable instructions causing the system to perform the steps of: receiving a request for user set recommendations from any of a set of retailers where such request is related to one or more products; receiving from a plurality of user sets from one or more automated user recommendation systems, wherein the plurality of user sets are generated using different user models; and using ensemble learning to select one or more most relevant user sets from the plurality of user sets.

In a further example, the above needs are met by providing an arrangement for improving product recommendations for a first user comprising: a controller that receives a request for user set recommendations from any of a set of retailers where such request is related to one or more products, receives from a plurality of user sets from one or more automated user recommendation systems, wherein the plurality of user sets are generated using different user models, and uses ensemble learning to select one or more most relevant user sets from the plurality of user sets.

Figure 16:
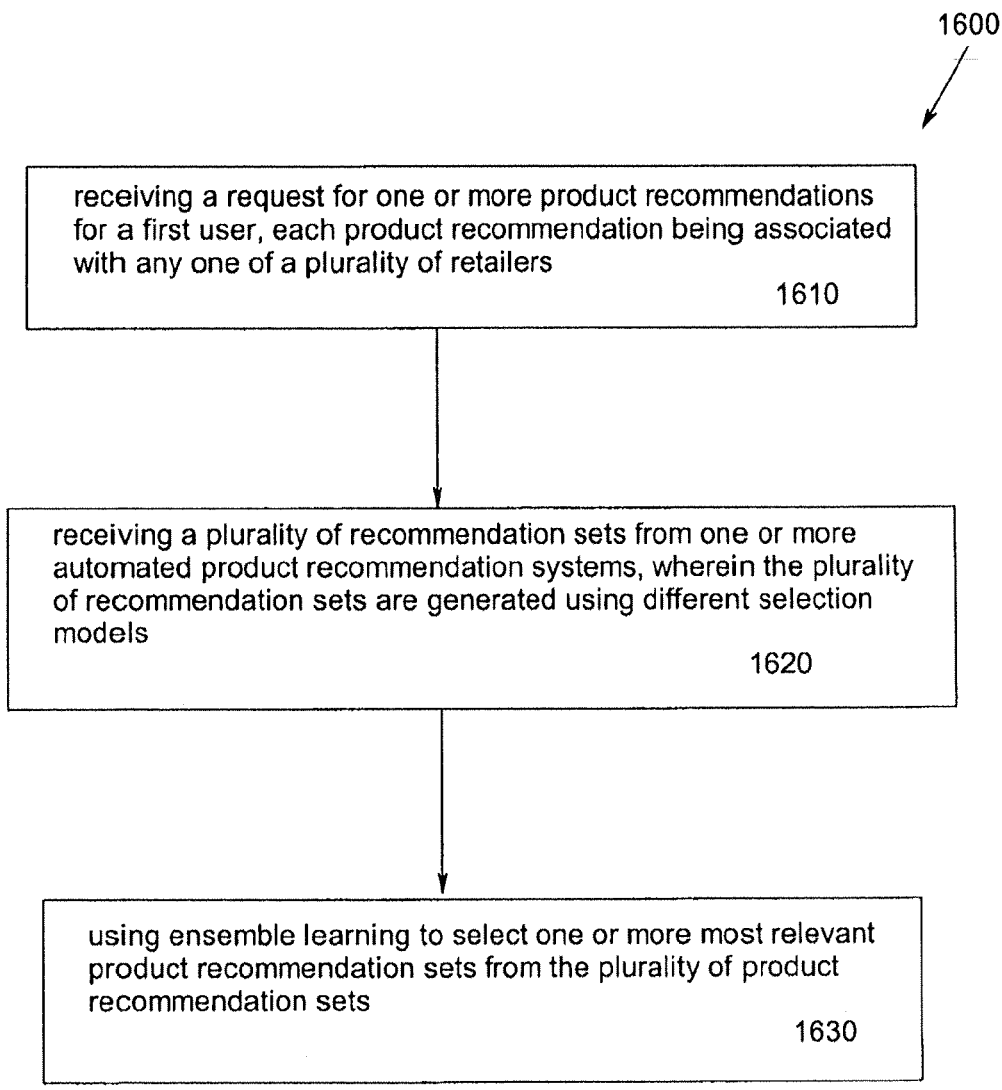
FIG. 16 is a flow chart depicting a process for using ensemble learning to improve product recommendation sets for a user.

The process for using ensemble learning to improve product recommendation sets for a user 1600 is shown in FIG. 16. As shown in FIG. 16, the process for using ensemble learning to improve product recommendation sets for a user 1600 includes the steps of: receiving a request for one or more product recommendations for a first user, each product recommendation being associated with any one of a plurality of retailers 1610; receiving a plurality of recommendation sets from one or more automated product recommendation systems, wherein the plurality of recommendation sets are generated using different selection models 1620; and using ensemble learning to select one or more most relevant product recommendation sets from the plurality of product recommendation sets 1630.

Similarly, the process for using ensemble learning to improve user set recommendations for product advertising 1700 is shown in FIG. 17. As shown in FIG. 17, the process for using ensemble learning to improve user set recommendations for product advertising 1700 includes the steps of receiving a request for user set recommendations from any of a set of retailers where such request is related to one or more products 1710; receiving from a plurality of user sets from one or more automated user recommendation systems, wherein the plurality of user sets are generated using different user models 1720; and using ensemble learning to select one or more most relevant user sets from the plurality of user sets.

Closed-feedback loops may be used with models to improve their recommendations. For example, user interaction with recommendations can be observed, stored and used in to bring the selection and user models in line with the observations. Therefore, while purely theoretical models are useful in some situations (particularly situations with a low volume of observed behavior), models based on actual user behavior with respect to a given recommendation may be more beneficial in other situations. Therefore, when choosing between a plurality of recommendations, whether individual recommendations or sets of recommendations, it may be advantageous to consider both actual past user behavior as well as predicted future behavior.

As described above, closed-feedback loops are utilized to further enhance the quality of the selection of product recommendation sets. For example, data may be collected about behavior subsequent to the presentation of recommendations. For example, user behavior may be collected in response to product recommendations, such as, click-through, add-to-cart, and purchase behavior. These data are then utilized in the decision-making process in the future.

Ensemble learning is a selection process in which a recommendation set is chosen from a group of competing recommendation sets. Ensemble learning selects a recommendation set based on the past performance of the algorithm used to compile the recommendation set. For example, in a given scenario (particular user model, particular website, particular demographic data, etc.), a closed feedback loop may be used to track the performance of various models. The past performance of the algorithm can then be used as a variable in selecting between competing recommendation sets. Ensemble learning processes may also rank or select the best "n" recommendation sets, as opposed to only one recommendation set, from a group of competing recommendation sets.

For example, ensemble learning may be used to choose through three competing recommendation sets of products, one of which is to be provided to a given user visiting a given website. The first set may be generated using a selection model algorithm based on items recently viewed by the user. The second set may be generated using a selection model algorithm based on items previously purchased by the user. The third set may be generated using a selection model algorithm based on items similar to the one currently being viewed by the user. The data previously acquired via a closed feedback loop may be used to select the preferred recommendation set of the three generated based on ensemble learning. If, for example, the closed feedback loop data demonstrates that in the given scenario (taking into account the context in which and to whom the set is to be displayed) the past performance of the recommendation sets generated using a selection model algorithm based on items similar to the one currently being viewed by the user is superior to the past performance of the other two models, the ensemble learning process would select the third recommendation set to present to the user.

For the purposes of further illustration, if an e-commerce site requests recommendations to display for a particular user, that e-commerce site submits the request to the ensemble learning system. The system then requests recommendations from 15 different recommendation systems. Each system analyzes the data in a specific and differentiated manner from the other algorithms. Some example algorithms: one might look at a user's previous search behavior and find products which are relevant (say to "Harry Potter Book 5" search term, resulting in the recommendation of more Harry Potter books and some other children's fiction), another might look at the contents of this user's cart (for example, nothing and recommend nothing), and yet another may simply look at the user's past products and recommend products from the user's history (for example, Babylon 5 movies, Simpsons books and Star Trek movies, resulting in the recommendation of more Star Trek movies). Each recommendation set may also contain a "quality" score, indicating how strongly this recommendation set should be considered. Then, once the recommendation system has received all of these recommendation sets, the recommendation system will analyze each of the sets independently considering the past behavior of this algorithm, the current context of the user and the "quality" of each of the recommendation sets. In this example, the search algorithm tends to perform very well in this specific user context (the landing page of a web site) whereas the past products algorithm does not perform well. Therefore, the ensemble learning system chooses to rank the recommendation sets with the search-based algorithm first and the past-products algorithm second. If the site could display results from two different algorithms, both may be displayed with the search recommendations in a better location. If the site could display three or more recommendation sets, this logic continues.

In one example, the ensemble learning process utilizes a naïve Bayesian network to generate an inductive prediction. The inductive prediction may be used, for example, to generate the quality score described above or may otherwise be used to provide a relative rank. A naïve Bayesian network offers many advantages, such as speed in making a decision and a high-level of accuracy in real-world situations. A naïve Bayesian network would take the closed-loop behavioral data into account to predict the behavior of a user in the future. Other examples might utilize neural networks, linear regression techniques or other predictive models.

In the example wherein the ensemble learning process includes the use of a naïve Bayesian network, prior to utilizing a naïve Bayesian network, the controller determines whether there have been a sufficient number of closed-loop recommendation observations to make a direct prediction from past behavior in lieu of the inductive prediction. If, for example, the controller has over 1,000,000 observations of behavioral data collected from the closed-feedback loop indicating that a certain recommendation set performs the best, the direct observed data would be more powerful than any predictions from the Bayesian network. Therefore, in this case, the controller will ignore the Bayesian prediction. If, in another example, the controller only has 1,000 observations of behavioral data collected from the closed-feedback loop, the controller would take into consideration both the 1,000 observations and the prediction from the Bayesian network. In the preferred embodiment, an $x^2$ curve based on the number of observations is utilized to blend the two values (the prediction from the Bayesian network and the observed value). The exponential curve heavily favors the predicted inductive value generated from the Bayesian prediction when there are only a few observations, yet heavily favors the observed value when there are many observations. Using this blending of values enables the system to learn while simultaneously optimizing the recommendations. To continue the example of 1,000 observations, the exponential curve would weight the predictions from past behavior at $(1,000^2)/(1,000,000^2)$ while the inductive predictions would be weighted at $((1,000,000^2)-(1,000^2))/(1,000,000^2)$. When the number of observations reaches 1,000,000—the limit when the controller completely ignores the inductive prediction, this equation is consistent, yields a weighting of $(1,000,000^2)/(1,000,000^2)$ for the past behavior (a weight of 1), while the inductive predictions would be weighted at $((1,000,000^2)-(1,000,000^2))/(1,000,000^2)$ (a weight of 0).

As shown by the above descriptions, aspects of the systems are controlled by one or more controllers. Typically, the one or more controllers are implemented by one or more programmable data processing devices. The hardware elements, operating systems and programming languages of such devices are conventional in nature, and it is presumed that those skilled in the art are adequately familiar therewith. Accordingly, any device that may be used to perform the functions described herein with respect to the controller may be substituted for the controllers described in the examples above. For example, in some instances the functions of the controller may be embodied in programmable instructions, for example, on a CD-ROM, a flash drive or any other memory.

For example, the controller may be a microprocessor in a portable arrangement, such as, for example, a cellular phone, a personal digital assistant, a audio/video playing device, etc. These systems, including microprocessors, are referred to generically herein as computer systems. In another example, the controller maybe a PC based implementation of a central control processing system. The PC based system contains a central processing unit (CPU), memories and an interconnect bus. The CPU may contain a single microprocessor (e.g. a Pentium microprocessor), or it may contain a plurality of microprocessors for configuring the CPU as a multi-processor system. The other components of the computer system described above include memories, including a main memory, such as a dynamic random access memory (DRAM) and cache, as well as a read only memory, such as a PROM, an EPROM, a FLASH-EPROM, or the like. The system also includes mass storage devices such as various disk drives, tape drives, etc. In operation, the main memory stores at least portions of instructions for execution by the CPU and data for processing in accord with the executed instructions.

The mass storage may include one or more magnetic disk or tape drives or optical disk drives, for storing data and instructions for use by CPU. For example, at least one mass storage system in the form of a disk drive or tape drive stores the operating system and various application software as well as data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The computer system also includes one or more input/output interfaces for communications, shown by way of example as an interface for data communications with one or more processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the controller. For example, the computer system may include a graphics subsystem to drive the output display. The output display, for example, may include a cathode ray tube (CRT) display, or a liquid crystal display (LCD) or other type of display device. Although not shown, a PC type system implementation typically would include a port for connection to a printer. The input control devices for such an implementation of the computer system would include the keyboard for inputting alphanumeric and other key information. The input control devices for the computer system may further include a cursor control device (not shown), such as a mouse, a touchpad, a trackball, stylus, or cursor direction keys. The links of the peripherals to the computer system may be wired connections or use wireless communications.

The computer system runs a variety of applications programs and stores data, enabling one or more interactions via the user interface provided, and/or over a network to implement the desired processing.

The components contained in the systems are those typically found in general purpose computer systems. Although illustrated as a PC type device, those skilled in the art will recognize that the class of applicable computer systems also encompasses systems used as servers, workstations, network terminals, and the like. In fact, these components are intended to represent a broad category of such computer components that are well known in the art.

A software or program product may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Terms relating to computer or machine "readable medium" that may embody programming refer to any medium that participates in providing code or instructions to a processor for execution. Such a medium may take many forms, including but not limited to non-volatile media, volatile media, and transmission media. Non-volatile media include, for example, optical or magnetic disks, such as any of the storage devices in the computer system. Volatile media include dynamic memory, such as main memory. Transmission media include coaxial cables, copper wire and fiber optics including the wires that comprise a bus within a computer system. Transmission media can also take the form of electric or electromagnetic signals, or acoustic or light waves such as those generated during radio frequency or infrared data communications. In addition to storing programming in one or more data processing elements, various forms of computer readable media may be involved in carrying one or more sequences of one or more instructions to a processor for execution, for example, to install appropriate software in a system intended to serve as the controller 14.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A computer-implemented method comprising:
receiving, by a configured computing system, a request for one or more product recommendations to provide to an indicated user based at least in part on an information page for display to the indicated user, the information page having information about one or more products available from a retailer that are associated with one or more product categories and with one or more brands;
obtaining a plurality of product recommendation sets that are generated using multiple distinct selection algorithms;
using ensemble learning to select one of the multiple selection algorithms based at least in part on prior user behavior, and selecting one or more product recommendation sets from the plurality based on the selected one selection algorithm, wherein the selected one or more product recommendation sets are a subset of the plurality and each includes indications of multiple products that are recommended by one of the multiple selection algorithms, and wherein the using of the ensemble learning and the selecting of the one or more product recommendation sets are performed by the configured computing system in response to the received request and are based at least in part on the one or more product categories and on the one or more brands associated with the one or more available products; and providing, by the configured computing system, an indication of one or more of the multiple products included in the selected one or more product recommendation sets, to enable information about at least one of the indicated one or more products to be provided for display to the indicated user.

2. The method of claim 1 wherein the prior user behavior occurred subsequent to previous product recommendations generated using one or more of the multiple selection algorithms, and wherein the selecting of the one or more product recommendation sets includes selecting one product recommendation set of the plurality based on the selected one product recommendation set being generated using the selected one selection algorithm.

3. The method of claim 1 wherein the multiple selection algorithms are part of multiple selection models, wherein the method further comprises comparing, by the configured computing system, prior performance of the multiple selection models by analyzing the prior user behavior, and wherein the selecting of the one selection algorithm is further based at least in part on the comparing of the prior performance.

4. The method of claim 1 wherein the selecting of the one or more product recommendation sets is further based at least in part on predictions of future user behavior from a Bayesian network.

5. The method of claim 4 wherein the Bayesian network is a natïBayesian network that utilizes information concerning the retailer, the information page, and the indicated user.

6. The method of claim 1 wherein the providing of the indication of the one or more products included in the selected one or more product recommendation sets includes electronically communicating the selected product recommendation sets.

7. The method of claim 1 wherein the information page is a Web page from a retail website of the retailer, and wherein the providing of the indication of the one or more products included in the selected one or more product recommendation sets further includes initiating display of advertising for the indicated one or more products on a copy of the Web page displayed to the indicated user.

8. The method of claim 1 wherein the information page is part of a retail website of the retailer, and wherein the providing of the indication of the one or more products included in the selected one or more product recommendation sets further includes initiating display of advertising for the indicated one or more products in one or more locations that are not part of the retail website.

9. The method of claim 1 further comprising generating a selection model using one of the multiple selection algorithms based at least in part on collected product information that includes at least one of the one or more product categories, and using the generated selection model to generate one of the selected one or more product recommendation sets.

10. The method of claim 1 further comprising generating a selection model using one of the multiple selection algorithms based at least in part on collected product information that includes at least one of the one or more brands, and using the generated selection model to generate one of the selected one or more product recommendation sets.

11. The method of claim 1 wherein the selected one or more product recommendation sets include a product recommendation set that is generated by a selection model using one of the multiple selection algorithms, the selection model being based at least in part on collected product information that includes at least one of the one or more product categories.

12. The method of claim 1 wherein the selected one or more product recommendation sets include a product recommendation set that is generated by a selection model using one of the multiple selection algorithms, the selection model being based at least in part on collected product information that includes at least one of the one or more brands.

13. The method of claim 1 wherein the configured computing system is part of a system for providing targeted content that is distinct from the retailer, wherein the received request includes information about one or more contextual attributes of the information page, and wherein the providing of the indication of the one or more products further includes providing advertising that is determined based at least in part on the contextual attributes.

14. The method of claim 13 wherein the information page is a Web page from a retail website of the retailer, and wherein the one or more contextual attributes include a Uniform Resource Locator (URL) of the Web page, a page/site hierarchy for the Web page, or information about a learned context based on historical user interactions with the Web page.

15. The method of claim 1 wherein the configured computing system is part of a system for providing targeted content that is distinct from the retailer, wherein the received request includes information about one or more profile attributes of the indicated user, and wherein the providing of the indication of the one or more products further includes providing advertising that is determined based at least in part on the profile attributes.

16. The method of claim 15 wherein the information page is a Web page from a retail website of the retailer, and wherein the one or more profile attributes include information about a history of pages viewed by the indicated user, information about a history of purchases by the indicated user, or information about tracked activity of the indicated user across multiple distinct websites.

17. The method of claim 1 wherein the obtaining of the plurality of product recommendation sets, the using of the ensemble learning to select one of the multiple selection algorithms, and the selecting of the one or more product recommendation sets are based at least in part on the one or more product categories and on the one or more brands and on a current context of the indicated user.

18. A non-transitory computer-readable medium having stored computer-executable instructions that when executed configure a computer system to perform a method, the method comprising:

receiving, by the configured computer system, a request for one or more recommendations to provide to an indicated user based at least in part on information for display to the indicated user, the information indicating one or more products that are associated with one or more product categories or with one or more brands;

obtaining information about a plurality of recommendation sets that are available to be generated using multiple selection algorithms, and selecting a recommendation set from the plurality that is generated by one of the multiple selection algorithms based at least in part on prior user behavior regarding the one selection algorithm, wherein the obtaining and selecting is performed by the configured computer system and is based at least in part on the one or more product categories or on the one or more brands; and providing, by the configured computer system, an indication of at least one product included in the selected recommendation set, to enable information about the at least one product to be provided to the indicated user.

19. The non-transitory computer-readable medium of claim 18 wherein the selecting of the recommendation set includes selecting the one selection algorithm using ensemble learning based at least in part on the prior user behavior, and selecting the recommendation set based on the selected recommendation set being generated using the selected one selection algorithm.

20. The non-transitory computer-readable medium of claim 18 wherein the information indicating the one or more products is a Web page from a retail website of a retailer, and wherein the providing of the indication of the at least one product further includes initiating display of advertising for the indicated at least one product on a copy of the Web page displayed to the indicated user.

21. The non-transitory computer-readable medium of claim 19 wherein the one or more products indicated in the information are associated with an indicated product category, and wherein the selected one selection algorithm is part of a selection model based at least in part on collected product information that includes the indicated product category.

22. The non-transitory computer-readable medium of claim 19 wherein the one or more products indicated in the information are associated with an indicated brand, and wherein the selected one selection algorithm is part of a selection model based at least in part on collected product information that includes the indicated brand.

23. The non-transitory computer-readable medium of claim 18 wherein the received request includes information about one or more contextual attributes of a Web page from a retailer that includes the information indicating the one or more products, wherein the configured computer system is part of a system for providing targeted content that is distinct from the retailer, and wherein the providing of the indication of the at least one product further includes providing advertising that is determined based at least in part on the contextual attributes.

24. The non-transitory computer-readable medium of claim 18 wherein the received request includes information about one or more profile attributes of the indicated user, wherein the configured computer system is part of a system for providing targeted content that is distinct from a source that provides the information indicating the one or more products, and wherein the providing of the indication of the at least one product further includes providing advertising that is determined based at least in part on the profile attributes.

25. A system comprising:
a memory; and
a controller associated with the memory, wherein the controller is configured to:
receive a request for one or more recommendations to provide to an indicated user based at least in part on information for display to the indicated user, the information indicating one or more products that are associated with one or more product categories or with one or more brands;
obtain information about a plurality of recommendation sets that are available to be generated using multiple selection algorithms, and selecting a recommendation set from the plurality that is generated by one of the multiple selection algorithms, wherein the selecting is performed in response to the received request and is based at least in part on the one or more product categories or on the one or more brands; and
provide an indication of at least one product included in the selected recommendation set, to enable information about the at least one product to be provided to the indicated user.

26. The system of claim 25 wherein the selecting of the recommendation set includes selecting the one selection algorithm using ensemble learning based at least in part on prior user behavior, and selecting the recommendation set based on the selected recommendation set being generated using the selected one selection algorithm.

27. The system of claim 25 wherein the information indicating the one or more products is a Web page from a retail website of a retailer, and wherein the providing of the indication of the at least one product further includes initiating display of advertising for the indicated at least one product on a copy of the Web page displayed to the indicated user.

28. The system of claim 26 wherein the one or more products indicated in the information are associated with an indicated product category, and wherein the selected one selection algorithm is part of a selection model based at least in part on collected product information that includes the indicated product category.

29. The system of claim 26 wherein the one or more products indicated in the information are associated with an indicated brand, and wherein the selected one selection algorithm is part of a selection model based at least in part on collected product information that includes the indicated brand.

30. The system of claim 25 wherein the received request includes information about one or more profile attributes of the indicated user and about one or more contextual attributes of a Web page from a retailer that includes the information indicating the one or more products, and wherein the providing of the indication of the at least one product further includes providing advertising that is determined based at least in part on the profile attributes and on the contextual attributes.

* * * * *